United States Patent
Nagami et al.

(10) Patent No.: US 10,938,039 B2
(45) Date of Patent: Mar. 2, 2021

(54) ELECTRODE CATALYST FOR FUEL CELL AND METHOD OF PRODUCING THE SAME, AND CATHODE, ANODE, AND FUEL CELL INCLUDING ELECTRODE CATALYST

(71) Applicants: TOYOTA JIDOSHA KABUSHIKI KAISHA, Toyota (JP); CATALER CORPORATION, Kakegawa (JP)

(72) Inventors: Tetsuo Nagami, Nagoya (JP); Hiromitsu Tanaka, Nagakute (JP); Mikihiro Kataoka, Kakegawa (JP); Tomohiro Ishida, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 0 days.

(21) Appl. No.: 16/907,768

(22) Filed: Jun. 22, 2020

(65) Prior Publication Data
US 2020/0321629 A1    Oct. 8, 2020

Related U.S. Application Data

(62) Division of application No. 14/680,316, filed on Apr. 7, 2015, now Pat. No. 10,734,658.

(30) Foreign Application Priority Data

Apr. 15, 2014    (JP) ................ 2014-083300

(51) Int. Cl.
  *H01M 4/92*    (2006.01)
(52) U.S. Cl.
  CPC ............. *H01M 4/926* (2013.01); *H01M 4/92* (2013.01); *H01M 4/921* (2013.01); *Y02E 60/50* (2013.01)

(58) Field of Classification Search
  CPC ........ H01M 4/926; H01M 4/92; H01M 4/921; Y02E 60/50
  See application file for complete search history.

(56) References Cited

U.S. PATENT DOCUMENTS

| | | |
|---|---|---|
| 2004/0067847 A1 | 4/2004 | Kato |
| 2007/0298304 A1 | 12/2007 | Ohma et al. |
| 2008/0063915 A1 | 3/2008 | Yamamoto |
| (Continued) | | |

FOREIGN PATENT DOCUMENTS

| | | |
|---|---|---|
| CN | 102007629 A | 4/2011 |
| DE | 103 46 334 A1 | 4/2004 |
| (Continued) | | |

OTHER PUBLICATIONS

Rao, Ch Venkateswara, and B. Viswanathan "Monodispersed platinum nanoparticle supported carbon electrodes for hydrogen oxidation and oxygen reduction in proton exchange membrane fuel cells", The Journal of Physical Chemistry C 114.18 (2010); 8661-8667.

*Primary Examiner* — Milton I Cano
*Assistant Examiner* — Philip A. Stuckey
(74) *Attorney, Agent, or Firm* — Sughrue Mion, PLLC

(57) ABSTRACT

An electrode catalyst for a fuel cell including: a carbon support; and catalytic metal supported on the carbon support, the catalytic metal being selected from platinum or a platinum alloy, in which the carbon support has a crystallite size of (002) plane of carbon within a range of 5.0 nm or more and has a specific surface area within a range of 95 $m^2/g$ to 170 $m^2/g$, and the catalytic metal has a crystallite size of (220) plane of platinum within a range of 4.5 nm or less.

3 Claims, 20 Drawing Sheets

(56) References Cited

U.S. PATENT DOCUMENTS

| | | |
|---|---|---|
| 2009/0208780 A1 | 8/2009 | Sun et al. |
| 2010/0297524 A1 | 11/2010 | Kamachi et al. |
| 2011/0014550 A1 | 1/2011 | Jiang et al. |
| 2011/0200917 A1 | 8/2011 | Takahashi et al. |

FOREIGN PATENT DOCUMENTS

| | | |
|---|---|---|
| JP | S63-256138 A | 10/1988 |
| JP | 2000-268828 A | 9/2000 |
| JP | 2001-357857 A | 12/2001 |
| JP | 2006-179463 A | 7/2006 |
| JP | 2008-041253 A | 2/2008 |
| JP | 2010-92799 A | 4/2010 |
| JP | 2010-102889 A | 5/2010 |
| WO | 2005/106994 A1 | 11/2005 |

FIG. 3A

| SAMPLE NO. | | USE | MATERIAL | | OXIDATION STEP CONDITIONS | | | | |
|---|---|---|---|---|---|---|---|---|---|
| | | | CATALYTIC METAL | CARBON SUPPORT | TREATMENT METHOD | OXIDIZING AGENT | K/O (mol%) | HEAT TREATMENT TEMPERATURE IN Ar(°C) | THERMAL OXIDATION TEMPERATURE IN AIR(°C) |
| EXAMPLE | 1-1-1 | CATHODE | Pt | TOCA BLACK | OXIDIZING AGENT TREATMENT | KMnO4+H2SO4 | 4.1 | 700 | |
| EXAMPLE | 1-1-2 | CATHODE | Pt | TOCA BLACK | OXIDIZING AGENT TREATMENT | KMnO4+H2SO4 | 6.8 | 700 | |
| EXAMPLE | 1-1-3 | CATHODE | Pt | TOCA BLACK | OXIDIZING AGENT TREATMENT | KMnO4+H2SO4+NaNO3 | 2.7 | 700 | |
| EXAMPLE | 1-1-4 | CATHODE | Pt | TOCA BLACK | OXIDIZING AGENT TREATMENT | KMnO4+H2SO4+NaNO3 | 2.7 | 800 | |
| EXAMPLE | 1-1-5 | CATHODE | Pt | TOCA BLACK | OXIDIZING AGENT TREATMENT | KMnO4+H2SO4+NaNO3 | 2.7 | 900 | |
| EXAMPLE | 1-1-6 | CATHODE | Pt | TOCA BLACK | OXIDIZING AGENT TREATMENT | KMnO4+H2SO4+NaNO3 | 2.7 | 700 | |
| EXAMPLE | 1-1-7 | CATHODE | Pt | TOCA BLACK | OXIDIZING AGENT TREATMENT | KMnO4+H2SO4+NaNO3 | 4.1 | 700 | |
| EXAMPLE | 1-1-8 | CATHODE | Pt | TOCA BLACK | OXIDIZING AGENT TREATMENT | KMnO4+H2SO4+NaNO3 | 4.1 | 700 | |
| EXAMPLE | 1-1-9 | CATHODE | Pt | TOCA BLACK | OXIDIZING AGENT TREATMENT | KMnO4+H2SO4 | 4.1 | 700 | |
| EXAMPLE | 1-1-10 | CATHODE | Pt | TOCA BLACK | OXIDIZING AGENT TREATMENT | KMnO4+H2SO4 | 6.8 | 700 | |
| EXAMPLE | 1-1-11 | CATHODE | Pt | TOCA BLACK | THERMAL OXIDATION | | | | 590 |
| EXAMPLE | 1-1-12 | CATHODE | Pt | TOCA BLACK | THERMAL OXIDATION | | | | 600 |
| EXAMPLE | 1-1-13 | CATHODE | Pt | TOCA BLACK | THERMAL OXIDATION | | | | 600 |
| EXAMPLE | 1-1-14 | CATHODE | Pt | TOCA BLACK | THERMAL OXIDATION | | | | 610 |
| EXAMPLE | 1-1-15 | CATHODE | Pt | TOCA BLACK | THERMAL OXIDATION | | | | 620 |
| EXAMPLE | 1-1-16 | CATHODE | Pt | TOCA BLACK | THERMAL OXIDATION | | | | 630 |
| COMPARATIVE EXAMPLE | 1-1-1 | CATHODE | Pt | TOCA BLACK | NONE | | | | |
| COMPARATIVE EXAMPLE | 1-1-2 | CATHODE | Pt | TOCA BLACK | NONE | | | | |
| COMPARATIVE EXAMPLE | 1-1-3 | CATHODE | Pt | TOCA BLACK | NONE | | | | |

FIG. 3B

| SAMPLE NO. | | USE | MATERIAL | | OXIDATION STEP CONDITIONS | | | | |
|---|---|---|---|---|---|---|---|---|---|
| | | | CATALYTIC METAL | CARBON SUPPORT | TREATMENT METHOD | OXIDIZING AGENT | K/O (mol%) | HEAT TREATMENT TEMPERATURE IN Ar(°C) | THERMAL OXIDATION TEMPERATURE IN AIR(°C) |
| COMPARATIVE EXAMPLE | 1-1-4 | CATHODE | Pt | Ketjen | ONLY HEAT TREATMENT IN Ar | | | 2800 | |
| COMPARATIVE EXAMPLE | 1-1-5 | CATHODE | Pt | Ketjen | ONLY HEAT TREATMENT IN Ar | | | 2800 | |
| COMPARATIVE EXAMPLE | 1-1-6 | CATHODE | Pt | Ketjen | NONE | | | | |
| COMPARATIVE EXAMPLE | 1-1-7 | CATHODE | Pt | Ketjen | NONE | | | | |
| COMPARATIVE EXAMPLE | 1-1-8 | CATHODE | Pt | TOCA BLACK | NONE | | | | |
| COMPARATIVE EXAMPLE | 1-1-9 | CATHODE | Pt | TOCA BLACK | NONE | | | | |
| COMPARATIVE EXAMPLE | 1-1-10 | CATHODE | Pt | TOCA BLACK | THERMAL OXIDATION | | | | 550 |
| COMPARATIVE EXAMPLE | 1-1-11 | CATHODE | Pt | TOCA BLACK | THERMAL OXIDATION | | | | 560 |
| COMPARATIVE EXAMPLE | 1-1-12 | CATHODE | Pt | TOCA BLACK | THERMAL OXIDATION | | | | 570 |
| EXAMPLE | 1-2-1 | CATHODE | PtCo | TOCA BLACK | OXIDIZING AGENT TREATMENT | $KMnO_4+H_2SO_4+NaNO_3$ | 4.1 | 800 | |
| EXAMPLE | 1-2-2 | CATHODE | PtCo | TOCA BLACK | OXIDIZING AGENT TREATMENT | $KMnO_4+H_2SO_4+NaNO_3$ | 4.1 | 700 | |
| EXAMPLE | 1-2-3 | CATHODE | PtCo | TOCA BLACK | OXIDIZING AGENT TREATMENT | $KMnO_4+H_2SO_4$ | 4.1 | 700 | |
| EXAMPLE | 1-2-4 | CATHODE | PtCo | TOCA BLACK | OXIDIZING AGENT TREATMENT | $KMnO_4+H_2SO_4$ | 6.8 | 700 | |
| EXAMPLE | 1-2-5 | CATHODE | PtCo | TOCA BLACK | OXIDIZING AGENT TREATMENT | $KMnO_4+H_2SO_4+NaNO_3$ | 4.1 | 700 | |
| EXAMPLE | 1-2-6 | CATHODE | PtCo | TOCA BLACK | OXIDIZING AGENT TREATMENT | $KMnO_4+H_2SO_4+NaNO_3$ | 4.1 | 800 | |

FIG. 3C

| SAMPLE NO. | | USE | MATERIAL | | OXIDATION STEP CONDITIONS | | | | |
|---|---|---|---|---|---|---|---|---|---|
| | | | CATALYTIC METAL | CARBON SUPPORT | TREATMENT METHOD | OXIDIZING AGENT | K/O (mol%) | HEAT TREATMENT TEMPERATURE IN Ar (°C) | THERMAL OXIDATION TEMPERATURE IN AIR (°C) |
| EXAMPLE | 1-2-7 | CATHODE | PtCo | TOCA BLACK | OXIDIZING AGENT TREATMENT | $KMnO_4+H_2SO_4+NaNO_3$ | 4.1 | 700 | |
| EXAMPLE | 1-2-8 | CATHODE | PtCo | TOCA BLACK | OXIDIZING AGENT TREATMENT | $KMnO_4+H_2SO_4$ | 4.1 | 700 | |
| EXAMPLE | 1-2-9 | CATHODE | PtCo | TOCA BLACK | OXIDIZING AGENT TREATMENT | $KMnO_4+H_2SO_4$ | 6.8 | 700 | |
| EXAMPLE | 1-2-10 | CATHODE | PtCo | TOCA BLACK | THERMAL OXIDATION | | | | 600 |
| EXAMPLE | 1-2-11 | CATHODE | PtCo | TOCA BLACK | THERMAL OXIDATION | | | | 600 |
| EXAMPLE | 1-2-12 | CATHODE | PtCo | TOCA BLACK | THERMAL OXIDATION | | | | 610 |
| EXAMPLE | 1-2-13 | CATHODE | PtCo | TOCA BLACK | THERMAL OXIDATION | | | | 620 |
| EXAMPLE | 1-2-14 | CATHODE | PtCo | TOCA BLACK | THERMAL OXIDATION | | | | 630 |
| COMPARATIVE EXAMPLE | 1-2-1 | CATHODE | PtCo | TOCA BLACK | NONE | | | | |
| COMPARATIVE EXAMPLE | 1-2-2 | CATHODE | PtCo | Ketjen | NONE | | | | |
| COMPARATIVE EXAMPLE | 1-2-3 | CATHODE | PtCo | OSAB | NONE | | | | |
| COMPARATIVE EXAMPLE | 1-2-4 | CATHODE | PtCo | TOCA BLACK | NONE | | | | |
| COMPARATIVE EXAMPLE | 1-2-5 | CATHODE | PtCo | TOCA BLACK | NONE | | | | |
| EXAMPLE | 2-1-1 | ANODE | Pt | TOCA BLACK | THERMAL OXIDATION | | | | 630 |
| EXAMPLE | 2-1-2 | ANODE | Pt | TOCA BLACK | THERMAL OXIDATION | | | | 630 |
| COMPARATIVE EXAMPLE | 2-1-1 | ANODE | Pt | TOCA BLACK | NONE | | | | |
| COMPARATIVE EXAMPLE | 2-1-2 | ANODE | Pt | TOCA BLACK | NONE | | | | |

FIG. 4A

| SAMPLE NO. | | PHYSICAL PROPERTIES OF CARBON SUPPORT | | | | | PHYSICAL PROPERTIES OF CATALYTIC METAL | | | | PHYSICAL PROPERTIES OF ELECTRODE CATALYST | |
|---|---|---|---|---|---|---|---|---|---|---|---|---|
| | | Lc (nm) | Specific surface area (m²/g) | Oxygen concentration (mass%) | G-band FWHM (cm⁻¹) | D/G ratio | Pt support amount (added value) (mass%) | Pt support amount (analysis value) (mass%) | Co support amount (analysis value) (mass%) | Pt(220) crystallite size (nm) | CO adsorption amount (ml/g-Pt) | ECSA retention (%) |
| EXAMPLE | 1-1-1 | 5.4 | 106 | 1.96 | 38 | 0.79 | 30 | | | 4.1 | 24 | 77 |
| EXAMPLE | 1-1-2 | 5.3 | 125 | 2.64 | 41 | 0.89 | 30 | | | 3.9 | 25 | 84 |
| EXAMPLE | 1-1-3 | 5.3 | 95 | 1.83 | 37 | 0.74 | 20 | | | 3.6 | 30 | 76 |
| EXAMPLE | 1-1-4 | 5.4 | 97 | 1.32 | 37 | 0.73 | 20 | | | 3.4 | 28 | |
| EXAMPLE | 1-1-5 | 5.4 | 98 | 0.87 | 37 | 0.73 | 20 | | | 3.7 | 28 | 78 |
| EXAMPLE | 1-1-6 | 5.3 | 95 | 1.83 | 37 | 0.74 | 20 | | | 3.7 | 27 | |
| EXAMPLE | 1-1-7 | 5.3 | 98 | 2.18 | 38 | 0.79 | 20 | | | 3.6 | 29 | 75 |
| EXAMPLE | 1-1-8 | 5.3 | 98 | 2.18 | 38 | 0.79 | 20 | | | 3.7 | 26 | |
| EXAMPLE | 1-1-9 | 5.4 | 106 | 1.96 | 40 | 0.85 | 20 | | | 3.6 | 28 | 72 |
| EXAMPLE | 1-1-10 | 5.3 | 125 | 2.64 | 41 | 0.89 | 20 | | | 3.4 | 31 | 69 |
| EXAMPLE | 1-1-11 | 5.2 | 126 | 0.74 | | | 20 | | | 3.6 | 25 | 76 |
| EXAMPLE | 1-1-12 | 5.4 | 135 | 0.93 | 35 | 0.60 | 20 | | | 3.5 | 27 | 72 |
| EXAMPLE | 1-1-13 | 5.4 | 135 | 0.93 | 35 | 0.60 | 20 | | | 3.4 | 31 | 74 |
| EXAMPLE | 1-1-14 | 5.3 | 145 | 0.98 | 34 | 0.55 | 20 | | | 3.3 | 31 | 68 |
| EXAMPLE | 1-1-15 | 5.3 | 156 | 1.19 | 35 | 0.69 | 20 | | | 3.3 | 30 | 67 |
| EXAMPLE | 1-1-16 | 5.3 | 163 | 1.24 | 34 | 0.64 | 20 | | | 3.2 | 32 | 66 |
| COMPARATIVE EXAMPLE | 1-1-1 | 5.3 | 79 | 0.07 | 39 | 0.34 | 30 | | | 5.9 | 17 | |
| COMPARATIVE EXAMPLE | 1-1-2 | 5.3 | 79 | 0.07 | 39 | 0.34 | 30 | | | 5.9 | 16 | |
| COMPARATIVE EXAMPLE | 1-1-3 | 5.3 | 79 | 0.07 | 39 | 0.34 | 30 | | | 5.9 | 16 | |

FIG. 4B

| SAMPLE NO. | | PHYSICAL PROPERTIES OF CARBON SUPPORT | | | | PHYSICAL PROPERTIES OF CATALYTIC METAL | | | | PHYSICAL PROPERTIES OF ELECTRODE CATALYST | |
|---|---|---|---|---|---|---|---|---|---|---|---|
| | | Lc (nm) | SPECIFIC SURFACE AREA (m²/g) | OXYGEN CONCENTRATION (mass%) | G-BAND FWHM (cm⁻¹) | D/G RATIO | Pt SUPPORT AMOUNT (ADDED VALUE) (mass%) | Pt SUPPORT AMOUNT (ANALYSIS VALUE) (mass%) | Co SUPPORT AMOUNT (ANALYSIS VALUE) (mass%) | Pt(220) CRYSTALLITE SIZE (nm) | CO ADSORPTION AMOUNT (ml/g-Pt) | ECSA RETENTION (%) |
| COMPARATIVE EXAMPLE | 1-1-4 | | 123 | | | | | | | 4.8 | 19 | |
| COMPARATIVE EXAMPLE | 1-1-5 | | 123 | | | | | | | 4.9 | 18 | |
| COMPARATIVE EXAMPLE | 1-1-6 | 2.0 | 800 | 2.16 | 81 | 1.18 | 30 | | | 3.2 | 32 | 58 |
| COMPARATIVE EXAMPLE | 1-1-7 | 2.0 | 800 | 2.16 | 81 | 1.18 | 30 | | | 4.2 | 22 | 78 |
| COMPARATIVE EXAMPLE | 1-1-8 | 5.0 | 79 | 0.07 | 39 | 0.34 | 30 | | | 4.6 | 21 | |
| COMPARATIVE EXAMPLE | 1-1-9 | 5.0 | 79 | 0.07 | 39 | 0.34 | 20 | | | 4.6 | 23 | 85 |
| COMPARATIVE EXAMPLE | 1-1-10 | 5.2 | 95 | 0.28 | 33 | 0.45 | 20 | | | 4.3 | 22 | |
| COMPARATIVE EXAMPLE | 1-1-11 | 5.4 | 98 | 0.38 | 33 | 0.54 | 20 | | | 4.4 | 21 | |
| COMPARATIVE EXAMPLE | 1-1-12 | 5.3 | 105 | 0.44 | 34 | 0.57 | 20 | | | 4.2 | 22 | |
| EXAMPLE | 1-2-1 | 5.3 | 109 | 1.79 | 38 | 0.79 | 30 | 28.4 | 2.71 | 4.5 | 20 | 81 |
| EXAMPLE | 1-2-2 | 5.4 | 98 | 2.18 | 38 | 0.79 | 30 | 29.0 | 2.13 | 3.8 | 20 | 83 |
| EXAMPLE | 1-2-3 | 5.4 | 105 | 2.00 | 38 | 0.79 | 30 | 28.5 | 2.31 | 4.0 | 20 | 77 |
| EXAMPLE | 1-2-4 | 5.3 | 125 | 2.64 | 41 | 0.89 | 30 | 29.2 | 2.10 | 4.0 | 22 | 84 |
| EXAMPLE | 1-2-5 | 5.4 | 98 | 2.18 | 38 | 0.79 | 20 | 18.4 | 1.72 | 3.9 | 24 | 82 |
| EXAMPLE | 1-2-6 | 5.3 | 109 | 1.78 | 38 | 0.79 | 20 | 19.3 | 1.68 | 3.7 | 24 | 80 |

FIG. 4C

| SAMPLE NO. | | PHYSICAL PROPERTIES OF CARBON SUPPORT | | | | PHYSICAL PROPERTIES OF CATALYTIC METAL | | | | PHYSICAL PROPERTIES OF ELECTRODE CATALYST | |
|---|---|---|---|---|---|---|---|---|---|---|---|
| | | Lc (nm) | SPECIFIC SURFACE AREA ($m^2/g$) | OXYGEN CONCENTRATION (mass%) | G-BAND FWHM ($cm^{-1}$) | D/G RATIO | Pt SUPPORT AMOUNT (ADDED VALUE) (mass%) | Pt SUPPORT AMOUNT (ANALYSIS VALUE) (mass%) | Co SUPPORT AMOUNT (ANALYSIS VALUE) (mass%) | Pt(220) CRYSTALLITE SIZE (nm) | CO ADSORPTION AMOUNT (ml/g-Pt) | ECSA RETENTION (%) |
| EXAMPLE | 1-2-7 | 5.4 | 98 | 2.18 | 38 | 0.79 | 20 | 18.3 | 1.36 | 3.5 | 24 | 79 |
| EXAMPLE | 1-2-8 | 5.4 | 106 | 1.96 | 38 | 0.79 | 20 | 18.9 | 1.36 | 3.4 | 26 | 77 |
| EXAMPLE | 1-2-9 | 5.3 | 125 | 2.64 | 41 | 0.89 | 20 | 17.7 | 1.13 | 3.5 | 29 | 76 |
| EXAMPLE | 1-2-10 | 5.4 | 135 | 0.93 | 35 | 0.60 | 20 | 19.4 | 1.38 | 3.7 | 24 | 78 |
| EXAMPLE | 1-2-11 | 5.2 | 135 | 0.93 | 35 | 0.60 | 20 | 18.4 | 0.81 | 3.6 | 28 | 78 |
| EXAMPLE | 1-2-12 | 5.3 | 145 | 0.98 | 34 | 0.55 | 20 | 18.3 | 0.88 | 3.5 | 28 | 72 |
| EXAMPLE | 1-2-13 | 5.3 | 156 | 1.19 | 35 | 0.69 | 20 | 18.3 | 1.05 | 3.4 | 30 | 67 |
| EXAMPLE | 1-2-14 | 5.3 | 163 | 1.24 | 34 | 0.64 | 20 | 18.4 | 0.90 | 3.3 | 30 | 70 |
| COMPARATIVE EXAMPLE | 1-2-1 | 5.3 | 79 | 0.07 | 39 | 0.34 | 30 | | | 6.3 | 13 | 94 |
| COMPARATIVE EXAMPLE | 1-2-2 | 2.0 | 800 | 2.16 | 81 | 1.18 | 30 | | | 3.0 | 29 | 59 |
| COMPARATIVE EXAMPLE | 1-2-3 | 1.8 | 800 | 6.64 | 68 | 1.50 | 30 | | | 3.8 | 23 | 70 |
| COMPARATIVE EXAMPLE | 1-2-4 | 5.3 | 79 | 0.07 | 39 | 0.34 | 20 | | | 5.4 | 17 | 94 |
| COMPARATIVE EXAMPLE | 1-2-5 | 5.3 | 79 | 0.07 | 39 | 0.34 | 20 | 4.9 | | 5.2 | 16 | 91 |
| EXAMPLE | 2-1-1 | 5.3 | 163 | 1.24 | 34 | 0.64 | 5 | | | 2.3 | 57 | |
| EXAMPLE | 2-1-2 | 5.3 | 163 | 1.24 | 34 | 0.64 | 10 | | | 2.6 | 42 | |
| COMPARATIVE EXAMPLE | 2-1-1 | 5.3 | 79 | 0.07 | 39 | 0.34 | 5 | | | 2.8 | 34 | |
| COMPARATIVE EXAMPLE | 2-1-2 | 5.3 | 79 | 0.07 | 39 | 0.34 | 10 | | | 3.1 | 31 | |

US 10,938,039 B2

ELECTRODE CATALYST FOR FUEL CELL AND METHOD OF PRODUCING THE SAME, AND CATHODE, ANODE, AND FUEL CELL INCLUDING ELECTRODE CATALYST

INCORPORATION BY REFERENCE

This is a divisional of application Ser. No. 14/680,316, filed Apr. 7, 2015, now U.S. Pat. No. 10,734,658, claiming priority from Japanese Patent Application No. 2014-083300, filed Apr. 15, 2014, the contents of which are hereby incorporated by reference into this application.

BACKGROUND OF THE INVENTION

1. Field of the Invention

The present invention relates to an electrode catalyst for a fuel cell and a method of producing the same; and a cathode, an anode, and a fuel cell including the electrode catalyst.

2. Description of Related Art

In a fuel cell, hydrogen electrochemically reacts with oxygen to generate power. In principle, a product which is produced along with the power generation of a fuel cell is only water. Accordingly, a fuel cell has attracted attention as a clean power generation system that places substantially no burden on the global environment.

In a fuel cell, an electromotive force is generated by supplying fuel gas containing hydrogen to an anode side (fuel electrode) and supplying oxidizing gas containing oxygen to a cathode (air electrode) side. Here, an oxidation reaction represented by the following formula (1) progresses on the anode side, a reduction reaction represented by the following formula (2) progresses on the cathode side, and a reaction represented by the following formula (3) progresses as a whole. As a result, an electromotive force is supplied to an external circuit.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

Depending on the type of an electrolyte, fuel cells are classified into, for example, a polymer electrolyte fuel cell (PEFC), a phosphoric acid fuel cell (PAFC), a molten carbonate fuel cell (MCFC), and a solid oxide fuel cell (SOFC). In PEFC and PAFC among these fuel cells, generally, an electrode catalyst is used, the electrode catalyst including: a conductive support such as a carbon support; and particles of catalytic metal having catalytic activity such as platinum or a platinum alloy that are supported on the conductive support.

Under operating conditions of a fuel cell, the carbon support of the electrode catalyst is electrochemically oxidized due to a reaction represented by the following formula (4). Along with oxidation reaction, carbon dioxide which is converted from carbon atoms constituting the carbon support is separated from the carbon support.

$$C + 2H_2O \rightarrow CO_2 + 4H^+ + 4e^- \quad (4)$$

The oxidation-reduction potential of the reaction represented by the formula (4) is approximately 0.2 V. Therefore, under operating conditions of a fuel cell, the reaction represented by the formula (4) may progress slowly. As a result, when a fuel cell operates for a long period of time, "thinning" of an electrode may be observed along with a decrease in the amount of carbon in the carbon support. The "thinning" of the electrode may bring about a decrease in the performance of the fuel cell.

Typically, the carbon support used in the electrode catalyst has a large specific surface area, that is, a low-crystalline graphite structure on a surface thereof. The particles of the catalytic metal can be supported on the surface having a large specific surface area with high dispersibility. Accordingly, the mass activity of an electrode catalyst obtained as a product can be improved by using the carbon support having a large specific surface area. In addition, the progress of the reaction represented by the formula (4) is inhibited due to carbon of a high-crystalline graphite structure. Accordingly, generally, a carbon support having a high-crystalline graphite structure has high durability against the oxidation reaction represented by the formula (4).

In order to increase the specific surface area of a carbon support, it is necessary to modify a surface structure of the carbon support. However, when the surface structure of the carbon support is modified, the graphite structure on the surface thereof may be disturbed. That is, the oxidation resistance of a carbon support may decrease due to an increase in the specific surface area of the carbon support. Therefore, techniques of using a high-crystalline carbon support in an electrode catalyst for a fuel cell have been developed.

For example, International Publication WO 2005/106994 describes: a cathode catalyst layer that contains a cathode catalyst including platinum or a platinum alloy, a conductive carbon material supporting the cathode catalyst, and a proton conductive polymer electrolyte; and an anode catalyst layer that contains an anode catalyst, a conductive carbon material supporting the anode catalyst, and a proton conductive polymer electrolyte. This document also describes that the conductive carbon material of the cathode catalyst layer contains graphitized carbon black and that the BET surface area of the carbon black is 100 $m^2/g$ to 300 $m^2/g$.

Japanese Patent Application Publication No. 2000-268828 (JP 2000-268828 A) describes a polymer electrolyte fuel cell including: a gas diffusion electrode that contains an electrode catalyst in which platinum or a platinum alloy is supported on a carbon support; and an electrolyte that is formed of an ion exchange resin, in which an average lattice spacing $d_{(002)}$ [002] plane of the carbon support is 0.337 nm to 0.348 nm, a crystallite size $Lc_{(002)}$ of the carbon support is 3 nm to 18 nm, and a specific surface area of the carbon support is 70 $m^2/g$ to 800 $m^2/g$.

Japanese Patent Application Publication No. 2001-357857 (JP 2001-357857 A) describes a polymer electrolyte fuel cell including: an ion exchange membrane; and a cathode and an anode that are arranged opposite each other through the ion exchange membrane. The cathode contains an electrode catalyst in which platinum or a platinum alloy is supported on a carbon support; and an ion exchange resin, in which an average lattice spacing $d_{of\,[}002]$ plane of the carbon support calculated by X-ray diffraction is 0.340 nm to 0.362 nm, a crystallite size Lc of the carbon support is 0.6 nm to 4 nm, and a specific surface area of the carbon support is 260 $m^2/g$ to 800 $m^2/g$.

Japanese Patent Application Publication No. 2006-179463 (JP 2006-179463 A) describes a polymer electrolyte fuel cell including: a solid polymer electrolyte membrane; catalyst layers disposed on both sides of the solid polymer electrolyte membrane; gas diffusion layers disposed outside the catalyst layers; and separators disposed outside the gas diffusion layers, in which a cathode-sided catalyst layer of the catalyst layers contains: a carbon support including carbon in which an average lattice spacing d[002] plane calculated by X-ray diffraction is 0.343 nm to 0.358 nm, a crystallite size Lc is 3 nm to 10 nm, and a specific surface area is 200 m$^2$/g to 300 m$^2$/g; catalyst particles containing platinum supported on the carbon support; and an electrolyte.

Japanese Patent Application Publication No. 2010-102889 (JP 2010-102889 A) describes an electrode catalyst for a fuel cell, in which catalytic metal is supported on a high-crystalline carbon support with a carbon crystallization degree ranging from 57% to 90%. JP 2010-102889 A describes that a crystallite size Lc of the high-crystalline carbon is 2.3 nm or more.

Japanese Patent Application Publication No. 2008-41253 (JP 2008-41253 A) describes an electrode catalyst including: catalytic metal particles having an average crystallite size of 1 nm to 4 nm; and a carbon material supporting the catalytic metal particles, in which in the carbon material, an intensity ratio $R=I_D/I_G$ of a D-band peak intensity $I_D$ to a G-band peak intensity $I_G$ measured by Raman spectroscopy is 0.9 to 1.2.

As described above, techniques of using a high-crystalline carbon support in an electrode catalyst for a fuel cell have been developed. However, when the crystallinity of a carbon support is improved in order to improve the oxidation resistance of the carbon support, the specific surface area may decrease. A certain correlation is established between the specific surface area of a carbon support and the number of support sites of catalytic metal in the carbon support. When the specific surface area of a carbon support decreases, the dispersibility of catalytic metal supported on the carbon support may decrease. In this case, the mass activity of an electrode catalyst obtained as a product may decrease. As described above, an electrode catalyst for a fuel cell in which high-crystalline carbon support is used has room for performance improvement from the viewpoints of mass activity and durability.

SUMMARY OF THE INVENTION

The invention has been made to provide a technique for realizing both high mass activity and high durability in an electrode catalyst for a fuel cell.

The present inventors found that both mass activity and durability can be improved by causing catalytic metal to be supported on a carbon support which is obtained by oxidizing a carbon support material under predetermined conditions, thereby completing the invention.

According to a first aspect of the invention, there is provided an electrode catalyst for a fuel cell including: a carbon support; and catalytic metal supported on the carbon support, the catalytic metal being selected from platinum or a platinum alloy. The carbon support has a crystallite size (Lc) of (002) plane of carbon within a range of 5.0 nm or more and has a specific surface area within a range of 95 m$^2$/g to 170 m$^2$/g, and the catalytic metal has a crystallite size of (220) plane of platinum within a range of 4.5 nm or less.

An intensity ratio of a D-band peak intensity $I_D$ to a G-band peak intensity $I_G$ in a Raman spectrum of the carbon support may be lower than 0.9.

The carbon support may have pores having an average radius of 1.0 nm to 2.5 nm.

The catalytic metal may be platinum and may have a CO adsorption amount of 24 ml/g-Pt or more.

The catalytic metal may be a platinum alloy and may have a CO adsorption amount of 18 ml/g-Pt or more.

A support amount of the catalytic metal may be within a range of 15 mass % to 35 mass % with respect to a total mass of the electrode catalyst.

A support amount of the catalytic metal may be equal to or more than 4.5 mass % and be less than 15 mass % with respect to a total mass of the electrode catalyst.

According to a second aspect of the invention, there is provided a cathode including the above-described electrode catalyst.

According to a third aspect of the invention, there is provided an anode including the above-described electrode catalyst.

According to a fourth aspect of the invention, there is provided a fuel cell including at least one of the cathode according to the second aspect and the anode according to the third aspect.

According to a fifth aspect of the invention, there is provided a method of producing the electrode catalyst according to the first aspect. This method includes: oxidizing a carbon support material by thermally oxidizing the carbon support material in a temperature range of 580° C. to 650° C. in the presence of oxygen or by treating the carbon support material with an oxidizing agent such that a carbon support having a crystallite size (Lc) of (002) plane of carbon within a range of 5.0 nm or more and having a specific surface area within a range of 95 m$^2$/g to 170 m$^2$/g is obtained; and causing the obtained carbon support and a catalytic metal material selected from platinum and a platinum alloy to react with each other such that catalytic metal is supported on the carbon support.

The oxidizing agent may contain potassium permanganate.

An amount of the oxidizing agent may be within a range of 2.5 mol % to 14.5 mol % with respect to a total molar number of carbon atoms of the carbon support material.

According to the invention, both high mass activity and high durability can be realized in an electrode catalyst for a fuel cell.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 1A and 1B are transmission electron microscope (TEM) images showing a surface of a carbon support material (TOCA BLACK #3855), in which FIG. 1A is the image when a scale bar is 5 nm, and FIG. 1B is the image when a scale bar is 10 nm;

FIGS. 2A and 2B are transmission electron microscope (TEM) images showing a surface of a carbon support material after completion of an oxidation step in a method of producing an electrode catalyst for a fuel cell according to an embodiment of the invention, in which FIG. 2A is the TEM image showing the carbon support after performing the oxidation step through an oxidizing agent treatment under the same conditions as those of Examples 1-1-7, 1-1-8, 1-2-2, 1-2-5, and 1-2-7, and FIG. 2B is the TEM image showing the carbon support after performing the oxidation step through thermal oxidation under the same conditions as those of Examples 1-1-12, 1-1-13, 1-2-10, and 1-2-11;

FIGS. 3A to 3C show the summary of preparation conditions of electrode catalysts of Examples and Comparative Examples;

FIGS. 4A to 4C show physical properties of the electrode catalysts of Examples and Comparative Examples;

DETAILED DESCRIPTION OF EMBODIMENTS

Hereinafter, embodiments of the invention will be described in detail.

1. Electrode Catalyst for Fuel Cell

An embodiment of the present invention relates to an electrode catalyst for a fuel cell. This electrode catalyst for a fuel cell includes: a carbon support; and catalytic metal supported on the carbon support, the catalytic metal being selected from platinum (Pt) or a platinum alloy.

Figure 1A:
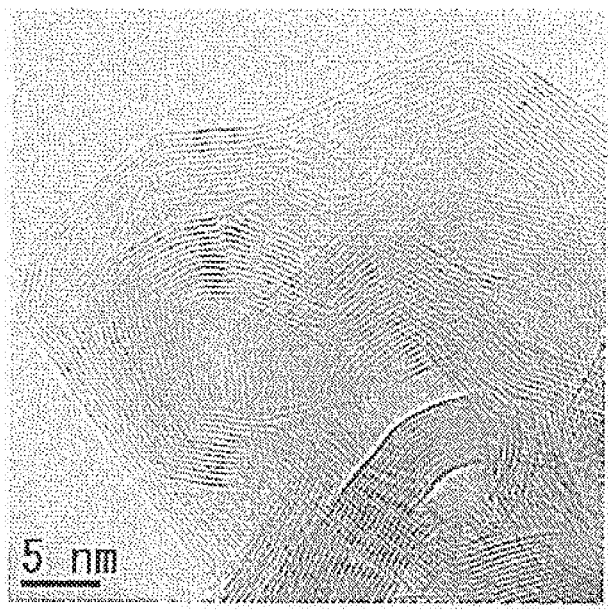
Figure 1B:
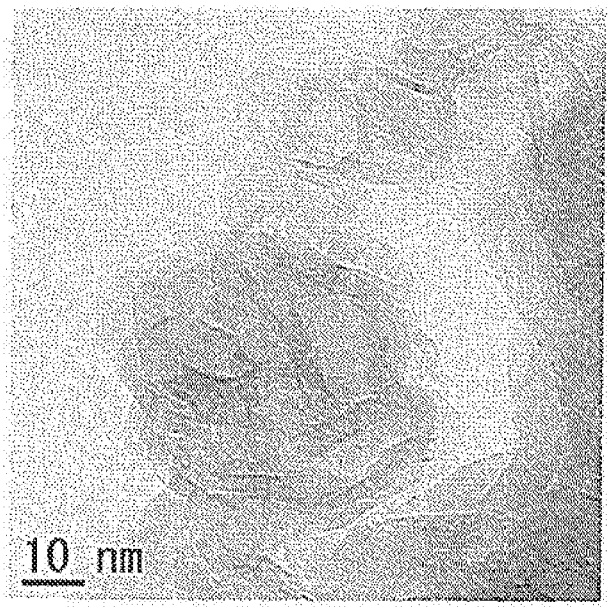

In an electrode catalyst for a fuel cell of the related art, a carbon support having a large specific surface area is used in order to improve mass activity (current density per unit mass of the carbon support) by causing catalytic metal to be supported on the carbon support with high dispersibility. Generally, a graphite crystal structure is developed on a surface of a carbon support (FIGS. 1A and 1B). The higher the crystallinity of graphite, the greater the thickness of a graphite crystal layer. The thickness of the graphite crystal layer is expressed by a crystallite size (Lc) of (002) plane of carbon determined not only based on a transmission electron microscope (TEM) image but also based on a X-ray diffraction (XRD) spectrum.

The crystallinity of a carbon support can be evaluated based on a Raman spectrum. In a Raman spectrum of a carbon support, it is known that a peak observed in a region of 1300 $cm^-$ to 1400 $cm^{-1}$ (hereinafter also referred to as "D-band peak") is derived from a non-graphite structure, and a peak observed in a region of 1500 $cm^{-1}$ to 1600 $cm^{-1}$ (hereinafter also referred to as "G-band peak") is derived from a graphite structure. A full width at half maximum of the G-band peak (hereinafter, also referred to as "G-band FWHM") may vary based on diversity of a graphite structure. It is considered that, the lower the G-band FWHM, the purer the graphite structure. In addition, it is considered that, the lower an intensity ratio (D/G ratio) of a D-band peak intensity $I_D$ to a G-band peak intensity $I_G$, the higher the crystallinity.

In a electrode catalyst for a fuel cell, the Lc and G-band FWHM of a carbon support are physical properties representing a graphite structure formed on a surface of the carbon support. On the other hand, a D/G ratio of a carbon support is a physical property representing an abundance ratio of a graphite structure formed in the carbon support. Under operating conditions of a fuel cell, it is expected that a carbon support is more likely to be oxidized in a non-graphite structure rather than a graphite structure. In addition, it is expected that a graphite structure in a carbon support is more likely to be oxidized in a low-crystalline portion. In an electrode catalyst for a fuel cell, when a carbon support is oxidized, catalytic metal particles may move and/or aggregate. When the catalytic metal particles of the electrode catalyst move and/or aggregate and are coarsened, the mass activity of the catalytic metal may decrease.

Therefore, it is considered that the durability (for example, high oxidation resistance) of an electrode catalyst for a fuel cell can be improved by increasing an abundance ratio of a graphite structure and using a high-crystalline carbon support. However, generally, the high-crystalline carbon support has a small specific surface area. Accordingly, in an electrode catalyst for a fuel cell, it is difficult to realize both high mass activity and high durability.

The present inventors found that, by oxidizing a carbon support material described below during production of an electrode catalyst for a fuel cell, a carbon support having a certain specific surface area, a large amount of graphite structure, and high crystallinity in the graphite structure can be obtained. By causing catalytic metal to be supported on a carbon support having the above-described characteristics, an electrode catalyst for a fuel cell having the catalytic metal supported with high dispersibility and having high oxidation resistance can be obtained.

The dispersion degree of the catalytic metal in the electrode catalyst for a fuel cell according to the embodiment can be evaluated based on, for example, a carbon monoxide (CO) adsorption amount of the electrode catalyst. The CO adsorption amount of the electrode catalyst for a fuel cell can be determined, for example, using the following method. A predetermined amount of electrode catalyst is weighed into a container. The electrode catalyst in the container is reduced in a hydrogen atmosphere. After completion of the reduction treatment, carbon monoxide is introduced into the container in the form of a pulse, and the CO adsorption amount of each electrode catalyst is determined. In addition, the oxidation resistance of the carbon support in the electrode catalyst for a fuel cell can be evaluated based on an electrochemical surface area (ECSA) retention of the electrode catalyst. The ECSA retention of the electrode catalyst for a fuel cell can be determined based on, for example, a rotating disk electrode method.

The carbon support included in the electrode catalyst for a fuel cell according to the embodiment has a crystallite size (Lc) of (002) plane of carbon within a range of 5.0 nm or more. The Lc is preferably within a range of 5.0 nm to 5.5 nm and more preferably within a range of 5.1 nm to 5.5 nm. When the Lc of the carbon support included in the electrode catalyst for a fuel cell is within the above-described range, the oxidation resistance is high, and/or the electrode catalyst having the catalytic metal supported with high dispersibility can be obtained.

The Lc can be determined, for example, using the following method. Using an X-ray diffractometer (XRD), an XRD spectrum of the carbon support included in the electrode catalyst for a fuel cell is measured. Based on the obtained XRD spectrum, the crystallite size (Lc) of (002) plane of carbon is determined using the Scherrer equation.

The carbon support included in the electrode catalyst for a fuel cell according to the embodiment has a specific surface area within a range of 95 $m^2/g$ to 170 $m^2/g$. The specific surface area is preferably within a range of 95 $m^2/g$ to 165 $m^2/g$ and more preferably within a range of 125 $m^2/g$ to 165 $m^2/g$. When the specific surface area of the carbon support included in the electrode catalyst for a fuel cell is 95 $m^2/g$ or greater, particularly 125 $m^2/g$ or greater, the electrode catalyst having the catalytic metal supported with high dispersibility can be obtained.

The specific surface area can be determined by measuring a BET specific surface area of the carbon support included in the electrode catalyst for a fuel cell based on a gas adsorption method using a specific surface area measuring device.

In the carbon support included in the electrode catalyst for a fuel cell according to the embodiment, it is preferable that an intensity ratio (hereinafter, also referred to as "D/G ratio") of a D-band peak intensity $I_D$ to a G-band peak intensity $I_G$ in a Raman spectrum is lower than 0.9. The D/G ratio is preferably within a range of 0.5 to lower than 0.9 and more preferably within a range of 0.6 to lower than 0.9. In addition, in the carbon support included in the electrode catalyst for a fuel cell according to the embodiment, the full width at half maximum of the G-band peak (hereinafter, also referred to as "G-band FWHM") is preferably within a range of 30 $cm^{-1}$ to 50 $cm^{-1}$ and more preferably within a range of 33 $cm^{-1}$ to 42 $cm^{-1}$. In the invention, "D-band peak" refers to a peak observed in a region of 1300 $cm^{-1}$ to 1400 $cm^{-1}$ and, typically, has a maximal absorption wavelength of 1360 $cm^-$. In addition, in the invention, "G-band peak" refers to a peak observed in a region of 1500 $cm^{-1}$ to 1600 $cm^{-1}$ and, typically, has a maximal absorption wavelength of 1580 $cm^{-1}$. In the embodiment, when the D/G ratio and the G-band FWHM of the carbon support included in the electrode catalyst for a fuel cell are within the above-described ranges, the oxidation resistance is high, and/or the electrode catalyst having the catalytic metal supported with high dispersibility can be obtained.

The D/G ratio and the G-band FWHM can be determined, for example, using the following method. Using a Raman spectrometer, a Raman spectrum of the carbon support included in the electrode catalyst for a fuel cell is measured. In the obtained Raman spectrum, a peak observed in a region of 1300 cm$^{-1}$ to 1400 cm$^{-1}$ is identified as a D-band peak, and a peak observed in a region of 1500 cm$^{-1}$ to 1600 cm$^{-1}$ is identified as a G-band peak. From the identified D-band peak and G-band peak, a G-band FWHM and a D/G ratio are determined.

It is preferable that the carbon support included in the electrode catalyst for a fuel cell according to the embodiment has at least pores having an average radius of 1.0 nm to 2.5 nm. The average radius of the pores is preferably within a range of 1.7 nm to 1.9 nm. In a method of producing the electrode catalyst for a fuel cell according to the embodiment described below, an oxidation step of oxidizing a carbon support material is performed to additionally form fine pores having a radius within the above-described range, in addition to pores which are initially present in the carbon support material. The pores present on the surface of the carbon support may function as support sites of the catalytic metal. Accordingly, in the embodiment, the carbon support included in the electrode catalyst for a fuel cell has at least pores having a radius within the above-described range; as a result, the electrode catalyst having the catalytic metal supported with high dispersibility can be obtained.

The average radius of the pores is not particularly limited but, for example, can be determined by measuring a pore distribution of the carbon support included in the electrode catalyst for a fuel cell using a pore distribution measuring device.

The catalytic metal included in the electrode catalyst for a fuel cell according to the embodiment has a crystallite size of (220) plane of platinum within a range of 4.5 nm or less. The crystallite size of (220) plane of platinum is preferably equal to or greater than 3.2 nm and smaller than 4.1 nm and more preferably equal to or greater than 3.3 nm and smaller than 4.1 nm. When the catalytic metal included in the electrode catalyst for a fuel cell has a crystallite size of (220) plane of platinum within a range of 4.5 nm or less, particularly less than 4.1 nm, the electrode catalyst having the catalytic metal supported with high dispersibility can be obtained. In addition, when the catalytic metal included in the electrode catalyst for a fuel cell has a crystallite size of (220) plane of platinum within a range of 3.2 nm or more, particularly 3.3 nm or more, the electrode catalyst having high oxidation resistance can be obtained.

Generally, in the catalytic metal included in the electrode catalyst for a fuel cell, the crystallite size of (220) plane of platinum may vary depending on the following factors. That is, the less the specific surface area of the carbon support included in the electrode catalyst for a fuel cell, the greater the crystallite size of (220) plane of platinum. The greater the support amount of platinum included in the electrode catalyst for a fuel cell, the greater the crystallite size of (220) plane of platinum. In addition, during production of the electrode catalyst for a fuel cell, the higher the heat treatment temperature after the supporting of platinum, the greater the crystallite size of (220) plane of platinum. As described above, the carbon support included in the electrode catalyst for a fuel cell according to the embodiment has a large crystallite size (Lc) (that is, 5.0 nm or more) of (002) plane of carbon. Generally, a carbon support having a high Lc has a small specific surface area. In the embodiment, the specific surface area can increase to a predetermined high value due to the oxidation step described below. Next, in order to adjust the crystallite size of (220) plane of platinum to be within the above-described range, in a catalytic metal supporting step described below, the platinum support amount and the heat treatment temperature are adjusted to be within predetermined ranges in consideration of the above-described variation factors. Specific conditions for obtaining the catalytic metal having a crystallite size of (220) plane of platinum within the above-described range can be determined by performing a preliminary test in advance to acquire correlations among the respective conditions and applying the correlations thereto. Using the above-described means, the catalytic metal having a crystallite size of (220) plane of platinum within the above-described range can be obtained.

The crystallite size of (220) plane of platinum can be determined, for example, using the following method. Using an X-ray diffractometer (XRD), an XRD spectrum of the catalytic metal included in the electrode catalyst for a fuel cell is measured. Based on the obtained XRD spectrum, the crystallite size of (220) plane of platinum is determined using the Scherrer equation. In addition, the crystallite size of (220) plane of platinum has a certain correlation with crystallite sizes of other lattice planes of platinum such as (111) plane. Accordingly, the crystallite size of (220) plane of platinum may be calculated based on the crystallite sizes of other lattice planes of platinum such as (111) plane.

It is preferable that the catalytic metal included in the electrode catalyst for a fuel cell according to the embodiment is platinum. In this case, the electrode catalyst for a fuel cell has a CO adsorption amount within a range of, usually, 24 ml/g-Pt or more and, typically, 24 ml/g-Pt to 35 ml/g-Pt. Alternatively, it is preferable that the catalytic metal included in the electrode catalyst for a fuel cell is a platinum alloy containing platinum and one or more additional metal elements. In this case, examples of the one or more additional metal elements which forms a platinum alloy with platinum include cobalt (Co), gold (Au), palladium (Pd), nickel (Ni), manganese (Mn), iridium (Ir), iron (Fe), copper (Cu), titanium (Ti), tantalum (Ta), niobe (Nb), yttrium (Y), and lanthanoid elements such as gadolinium (Gd), lanthanum (La), and cerium (Ce). As the one or more additional metal elements, cobalt (Co), gold (Au), palladium (Pd), nickel (Ni), manganese (Mn), copper (Cu), titanium (Ti), tantalum (Ta), or niobe (Nb) is preferably used. In the platinum alloy, an atomic ratio of platinum to the one or more additional metal elements is preferably within a range of 10:1 to 1:2. In this case, the electrode catalyst for a fuel cell according to the embodiment has a CO adsorption amount within a range of, usually, 18 ml/g-Pt or more, typically, 24 ml/g-Pt or more, and, particularly, 24 ml/g-Pt to 35 ml/g-Pt. In the electrode catalyst having a CO adsorption amount within the above-described range, the catalytic metal is supported on the carbon support with high dispersibility. Accordingly, when the electrode catalyst for a fuel cell has a CO adsorption amount within the above-described range, the electrode catalyst having the catalytic metal supported with high dispersibility can be obtained.

It is preferable that the electrode catalyst for a fuel cell according to the embodiment includes the catalytic metal having the above-described characteristics in a support amount of 2 mass % to 40 mass % with respect to the total mass of the electrode catalyst. Further, it is preferable that the electrode catalyst for a fuel cell includes the catalytic metal having the above-described characteristics in a support amount of 15 mass % to 35 mass % with respect to the total mass of the electrode catalyst. Alternatively, it is preferable that the electrode catalyst for a fuel cell includes the catalytic metal having the above-described characteristics in a support amount which is equal to or more than 4.5 mass % and less than 15 mass % with respect to the total mass of the electrode catalyst. When the electrode catalyst for a fuel cell includes the catalytic metal in a support amount of 15 mass % to 35 mass %, the electrode catalyst can be used as a cathode of a fuel cell. When the electrode catalyst for a fuel cell includes the catalytic metal in a support amount which is equal to or more than 4.5 mass % and less than 15 mass %, the electrode catalyst can be used as an anode of a fuel cell.

The support amount of the catalytic metal can be determined by dissolving the catalytic metal included in the electrode catalyst in, for example, aqua regia and determining the quantity of catalytic metal ions in the solution using an inductively coupled plasma (ICP) emission spectrometer.

In the electrode catalyst for a fuel cell according to the embodiment, it is particularly preferable that the crystallite size (Lc) of (002) plane of carbon and the specific surface area of the carbon support are within the above-described ranges and that the crystallite size of (220) plane of platinum of the catalytic metal is within the above-described range. In this case, depending on the type of the catalytic metal, the electrode catalyst for a fuel cell has a CO adsorption amount within the above-described range and has an ECSA retention within a range of, usually, 60% or more, typically, 65% or more, and, particularly, 75% or more. An ECSA retention in the above-described range is higher than an ECSA retention of an electrode catalyst for a fuel cell of the related art. Accordingly, when the electrode catalyst for a fuel cell according to the embodiment has a CO adsorption amount and an ECSA retention within the above-described ranges, the electrode catalyst having the catalytic metal supported with high dispersibility and having high oxidation resistance can be obtained.

2. Fuel Cell

As described above, the electrode catalyst for a fuel cell according to the embodiment can be used as any one of a cathode and an anode of a fuel cell.

In the electrode catalyst for a fuel cell according to the embodiment, the catalytic metal is supported with high dispersibility, and/or, the oxidation resistance is high. Accordingly, a fuel cell which includes at least one of a cathode and an anode including the electrode catalyst for a fuel cell according to the embodiment has high power generation capacity and can exhibit high durability even after use for a long period of time. By using such a fuel cell for an automobile or the like, high performance can be stably exhibited even after use for a long period of time.

3. Method of Producing Electrode Catalyst for Fuel Cell

A method of producing the electrode catalyst for a fuel cell according to the embodiment will be described below.

3-1. Oxidation Step

The method of producing the electrode catalyst for a fuel cell according to the embodiment includes an oxidation step of oxidizing a carbon support material by thermally oxidizing the carbon support material in the presence of oxygen or by treating the carbon support material with an oxidizing agent such that a carbon support having a crystallite size (Lc) of (002) plane of carbon within a range of 5.0 nm or more and having a specific surface area within a range of 95 $m^2/g$ to 170 $m^2/g$ is obtained.

In a method of producing an electrode catalyst for a fuel cell, a step of performing a heat treatment on a carbon support material in the presence of inert gas is often performed. This step is intended to develop a graphite structure on a surface of the carbon support material to improve the crystallinity of the carbon support material. By the crystallinity of the carbon support material being improved, the oxidation resistance of an electrode catalyst obtained as a product can be improved. However, by the crystallinity of the carbon support material being improved, the specific surface area of the carbon support material may decrease. Therefore, the heat treatment of the carbon support material in an inert gas atmosphere may contribute to the improvement of the oxidation resistance of an electrode catalyst obtained as a product, but may decrease the dispersion degree of the catalytic metal supported in the electrode catalyst.

The present inventors found that, by oxidizing a carbon support material under predetermined conditions, the specific surface area of a surface of a carbon support obtained as a product can increase to be within a predetermined range, and the crystallinity and the abundance ratio of a graphite structure can be kept within a predetermined range. Accordingly, by performing this step, the dispersibility of catalytic metal which is supported in an electrode catalyst obtained as a product can be improved, and the oxidation resistance thereof can be improved.

The carbon support material used in this step is not particularly limited as long as it can be commonly used in the technical field. It is preferable that the support material has a crystallite size (Lc) of (002) plane of carbon within a range of 5.0 nm or more and has Lc within a range of 5.0 nm to 9.0 nm. In addition, it is preferable that the support material has a specific surface area within a range of 80 $m^2/g$ or less and has a specific surface area within a range of 20 $m^2/g$ to 80 $m^2/g$. As the carbon support material, TOCA BLACK #3855 (trade name, manufactured by Tokai Carbon Co., Ltd.), TOCA BLACK #3845 (trade name, manufactured by Tokai Carbon Co., Ltd.), or TOCA BLACK #3800 (trade name, manufactured by Tokai Carbon Co., Ltd.) is particularly preferably used. By using the carbon support material having Lc and a specific surface area within the above-described ranges, a carbon support having the above-described characteristics can be obtained.

In this step, when the carbon support material is oxidized by thermally oxidizing the carbon support material in the presence of oxygen, the thermal oxidation temperature is necessarily within a range of 580° C. to 650° C. The thermal oxidation temperature is preferably within a range of 590° C. to 630° C. The thermal oxidation time at the thermal oxidation temperature is preferably within a range of 2 hours to 8 hours and more preferably within a range of 3 hours to 7 hours. The thermal oxidation is performed preferably in the presence of gas containing oxygen and more preferably in the presence of air. By performing this step under the above-described conditions, a carbon support having the above-described characteristics can be obtained.

In this step, when the carbon support material is oxidized by treating the carbon support material with an oxidizing agent, it is preferable that the oxidizing agent contains potassium permanganate, sulfuric acid, nitric acid, or hydrogen peroxide, and it is more preferable that the oxidizing agent contains potassium permanganate.

The amount of the oxidizing agent is preferably within a range of 2.5 mol % to 14.5 mol %, more preferably within a range of 2.5 mol % to 7.5 mol %, and still more preferably within a range of 4.0 mol % to 7.5 mol % with respect to the total molar number of carbon atoms of the carbon support material. When the oxidizing agent is used in a concentration of 14.5 mol % or lower, a D/G ratio of a carbon support obtained as a product can be adjusted to be within the above-described range. That is, the crystallinity and the abundance ratio of a graphite structure of the carbon support can be kept within desired ranges. In addition, when the oxidizing agent is used in a concentration of 2.5 mol % or higher, the oxidation reaction of the carbon support material can be performed in a controlled state. As a result, a carbon support having the above-described characteristics can be obtained.

The oxidizing agent used in this step may further include, in addition to the above-described components, one or more auxiliary components selected from the group consisting of sulfuric acid, potassium nitrate, hydrogen peroxide water, and sodium nitrate. The auxiliary components are preferably a combination of one or more components selected from the group consisting of sulfuric acid, potassium nitrate, and hydrogen peroxide water and more preferably a combination of sulfuric acid and hydrogen peroxide water or a combination of sulfuric acid, potassium nitrate and hydrogen peroxide water. By the oxidizing agent used in this step further including the above-described auxiliary components, the oxidation reaction of the carbon support material can be performed in a controlled state. As a result, a carbon support having the above-described characteristics can be obtained.

In this step, when the carbon support material is oxidized by treating the carbon support material with an oxidizing agent, an excess amount of oxygen may remain in the carbon support. When the carbon support includes an excess amount of oxygen, in a catalytic metal supporting step described below, carbon of the carbon support near the catalytic metal may be further oxidized due to the action of the catalytic metal. In this case, the amount of a support portion of the catalytic metal in the carbon support may decrease or be removed. Therefore, the movement and/or aggregation of the catalytic metal may be accelerated. Accordingly, in this step, when the carbon support material is oxidized by treating the carbon support material with an oxidizing agent, it is preferable that the step further includes a step of performing a heat treatment on the carbon support material, which is treated with the oxidizing agent, in the presence of inert gas. In this case, the heat treatment temperature is preferably within a range of 600° C. to 1000° C. and more preferably within a range of 700° C. to 900° C. The heat treatment time at the heat treatment temperature is preferably within a range of 1 hour to 6 hours and more preferably within a range of 1 hour to 3 hours. The inert gas is preferably argon, nitrogen or helium and more preferably argon. By performing a heat treatment on the carbon support material, which is treated with the oxidizing agent, under the above-described conditions, the movement and/or aggregation of the catalytic metal due to an excess amount of residual oxygen can be substantially inhibited.

It is preferable that the carbon support obtained in this step has a crystallite size (Lc) of (002) plane of carbon, a specific surface area, a D/G ratio, and a G-band FWHM within the above-described ranges.

The carbon support obtained in this step contains oxygen in an oxygen concentration of, usually, 0.6 mass % or more and, typically, 0.7 mass % to 2.8 mass % with respect to the total mass of the carbon support. When the oxygen concentration is 0.6 mass % or more, the amount of support sites of the catalytic metal can be sufficiently secured. In addition, when the oxygen concentration is 2.8 mass % or less, the movement and/or aggregation of the catalytic metal due to an excess amount of residual oxygen can be substantially inhibited. The oxygen concentration can be determined, for example, using an impulse heating and melting-NDIR method in inert gas.

Due to this step, fine pores are further formed in addition to pores which are initially present in the carbon support material. Therefore, the carbon support obtained in this step has at least pores having a radius within a range of, usually, 1.0 nm to 2.5 nm and, typically, 1.7 nm to 1.9 nm, in addition to pores which are initially present in the carbon support material. The pores present on the surface of the carbon support may function as support sites of the catalytic metal. Accordingly, the carbon support included in the electrode catalyst for a fuel cell according to the embodiment has additional pores having a radius within the above-described range; as a result, the electrode catalyst having the catalytic metal supported with high dispersibility can be obtained. The average radius of the pores present in the carbon support material or the carbon support can be determined using the above-described method.

3-2. Catalytic Metal Supporting Step

The method of producing the electrode catalyst for a fuel cell according to the embodiment includes a catalytic metal supporting step of causing the carbon support, which is obtained in the oxidation step, and a catalytic metal material selected from platinum and a platinum alloy to react with each other such that catalytic metal is supported on the carbon support.

It is preferable that the catalytic metal material used in this step includes a platinum-containing complex such as dinitro diammine platinum (II) nitrate or includes a hexahydroxo platinum amine complex. In addition, when the catalytic metal included in the electrode catalyst for a fuel cell produced using the method according to the embodiment is a platinum alloy, it is preferable that the catalytic metal material further includes, in addition to the above-described compounds, one or more additional metal elements such as cobalt nitrate, nickel nitrate, or manganese nitrate to form a platinum alloy with platinum.

This process can be performed by using an action which is commonly used in the technical field such as a colloidal method or a deposition-precipitation method.

It is preferable that this step further includes a step of performing a heat treatment on a product, which is obtained by causing the carbon support obtained in the oxidation step and a catalytic metal material selected from platinum and a platinum alloy to react with each other, in the presence of inert gas. In this case, the heat treatment temperature is preferably within a range of 600° C. to 1000° C. and more preferably within a range of 700° C. to 900° C. The heat treatment time at the heat treatment temperature is preferably within a range of 1 hour to 6 hours and more preferably within a range of 1 hour to 3 hours. The inert gas is preferably argon, nitrogen or helium and more preferably argon. By performing a heat treatment on a product, which is obtained by causing the carbon support obtained in the oxidation step and a catalytic metal material selected from platinum and a platinum alloy to react with each other, under the above-described conditions, an electrode catalyst in which the catalytic metal having desired characteristics is supported can be obtained.

As described above, in the method of producing the electrode catalyst for a fuel cell according to the embodiment, the carbon support material is oxidized under predetermined conditions. As a result, pores are formed on the surface of the carbon support material, and thus the specific surface area can be improved to be within a predetermined range. The pores may function as support sites of the catalytic metal. Accordingly, with the method of producing the electrode catalyst for a fuel cell according to the embodiment, an electrode catalyst for a fuel cell having the above-described characteristics and having both high mass activity and high durability can be obtained.

Hereinafter, the invention will be described in more detail using Examples. However, the technical scope of the invention is not limited to these Examples.

I. Preparation of Electrode Catalyst

I-1. Platinum Electrode Catalyst for Cathode

Example 1-1-1

20 g of a carbon support material (TOCA BLACK; #3855; manufactured by Tokai Carbon Co., Ltd.) was added to 350 g of sulfuric acid, followed by stirring. Next, 10.8 g (4.1 mol % with respect to the total molar number of carbon atoms of the carbon support material) of potassium permanganate was added, followed by stirring for 3 days and nights. Next, 800 g of ion exchange water was added, and then 6 ml of 30% hydrogen peroxide water was added. This mixture was stirred for one day and night and was filtered and washed. The washed product was filtered, and the solid content was added to 500 ml of 1 N nitric acid, followed by stirring for 1 day and night. The reaction product was filtered and washed. The washed product was dried at 80° C. for 15 hours and was subjected to a heat treatment in argon gas at 700° C. (conditions: heated at 5° C./min and kept at 700° C. for 2 hours) to obtain a carbon support (oxidation step). 420 g of 0.1 N nitric acid aqueous solution was added to 10 g of the carbon support and was dispersed therein. A dinitro diammine platinum (II) nitrate solution and 50 g of 99.5% ethanol were sequentially added to this dispersion, in which the dinitro diammine platinum (II) nitrate solution contains 4.29 g of Pt such that a Pt support amount was 30 mass % with respect to the total mass of a final product. This mixture was sufficiently stirred so as to be substantially homogeneous and was heated at 60° C. to 90° C. for 3 hours. After completion of heating, the obtained dispersion was repeatedly filtered and washed until the conductivity of the filtrate was 5 µS/cm or lower. The obtained solid content was dried by air blowing at 80° C. for 15 hours. The dried powder was subjected to a heat treatment in argon gas at 700° C. (conditions: heated at 5° C./min and kept at 700° C. for 2 hours) (catalytic metal supporting step). With the above-described method, powder of an electrode catalyst was obtained.

Example 1-1-2

20 g of a carbon support material (TOCA BLACK; #3855; manufactured by Tokai Carbon Co., Ltd.) was added to 350 g of sulfuric acid, followed by stirring. Next, 18 g (6.8 mol % with respect to the total molar number of carbon atoms of the carbon support material) of potassium permanganate was added, followed by stirring for 3 days and nights. Next, 800 g of ion exchange water was added, and then 10 ml of 30% hydrogen peroxide water was added. This mixture was stirred for one day and night and was filtered and washed. The washed product was filtered, and the solid content was added to 500 ml of 1 N nitric acid, followed by stirring for 1 day and night. The reaction product was filtered and washed. The washed product was dried at 80° C. for 15 hours and was subjected to a heat treatment in argon gas at 700° C. (conditions: heated at 5° C./min and kept at 700° C. for 2 hours) to obtain a carbon support (oxidation step). 420 g of 0.1 N nitric acid aqueous solution was added to 10 g of the carbon support and was dispersed therein. A dinitro diammine platinum (II) nitrate solution and 50 g of 99.5% ethanol were sequentially added to this dispersion, in which the dinitro diammine platinum (II) nitrate solution contains 4.29 g of Pt such that a Pt support amount was 30 mass % with respect to the total mass of a final product. This mixture was sufficiently stirred so as to be substantially homogeneous and was heated at 60° C. to 90° C. for 3 hours. After completion of heating, the obtained dispersion was repeatedly filtered and washed until the conductivity of the filtrate was 5 µS/cm or lower. The obtained solid content was dried by air blowing at 80° C. for 15 hours. The dried powder was subjected to a heat treatment in argon gas at 700° C. (conditions: heated at 5° C./min and kept at 700° C. for 2 hours) (catalytic metal supporting step). With the above-described method, powder of an electrode catalyst was obtained.

Example 1-1-3

20 g of a carbon support material (TOCA BLACK; #3855; manufactured by Tokai Carbon Co., Ltd.) was added to 350 g of sulfuric acid, followed by stirring. Next, 1.92 g of sodium nitrate and 18 g (2.7 mol % with respect to the total molar number of carbon atoms of the carbon support material) of potassium permanganate were added, followed by stirring for 3 days and nights. Next, 800 g of ion exchange water was added, and then 4 ml of 30% hydrogen peroxide water was added. This mixture was stirred for one day and night and was filtered and washed. The washed product was filtered, and the solid content was added to 500 ml of 1 N nitric acid, followed by stirring for 1 day and night. The reaction product was filtered and washed. The washed product was dried at 80° C. for 15 hours and was subjected to a heat treatment in argon gas at 700° C. (conditions: heated at 5° C./min and kept at 700° C. for 2 hours) to obtain a carbon support (oxidation step). 420 g of 0.1 N nitric acid aqueous solution was added to 10 g of the carbon support and was dispersed therein. A dinitro diammine platinum (II) nitrate solution and 50 g of 99.5% ethanol were sequentially added to this dispersion, in which the dinitro diammine platinum (II) nitrate solution contains 2.5 g of Pt such that a Pt support amount was 20 mass % with respect to the total mass of a final product. This mixture was sufficiently stirred so as to be substantially homogeneous and was heated at 60° C. to 90° C. for 3 hours. After completion of heating, the obtained dispersion was repeatedly filtered and washed until the conductivity of the filtrate was 5 µS/cm or lower. The obtained solid content was dried by air blowing at 80° C. for 15 hours. The dried powder was subjected to a heat treatment in argon gas at 700° C. (conditions: heated at 5° C./min and kept at 700° C. for 2 hours) (catalytic metal supporting step). With the above-described method, powder of an electrode catalyst was obtained.

Example 1-1-4

An electrode catalyst was prepared in the same procedure as that of Example 1-1-3, except that, in the oxidation step, the heat treatment temperature in argon gas was changed to 800° C.

Example 1-1-5

An electrode catalyst was prepared in the same procedure as that of Example 1-1-3, except that, in the oxidation step, the heat treatment temperature in argon gas was changed to 900° C.

Example 1-1-6

An electrode catalyst was prepared in the same procedure as that of Example 1-1-3, except that, in the catalytic metal supporting step, the heat treatment temperature in argon gas was changed to 800° C.

Example 1-1-7

An electrode catalyst was prepared in the same procedure as that of Example 1-1-3, except that, in the oxidation step, the addition amount of sodium nitrate was changed to 2.88 g, the addition amount of potassium permanganate was changed to 10.8 g (4.1 mol % with respect to the total molar number of carbon atoms of the carbon support material), and the addition amount of 30% hydrogen peroxide water was changed to 6 ml.

Example 1-1-8

An electrode catalyst was prepared in the same procedure as that of Example 1-1-3, except that, in the oxidation step, the addition amount of sodium nitrate was changed to 2.88 g, the addition amount of potassium permanganate was changed to 10.8 g (4.1 mol % with respect to the total molar number of carbon atoms of the carbon support material), and the addition amount of 30% hydrogen peroxide water was changed to 6 ml; and, in the catalytic metal supporting step, the heat treatment temperature in argon gas was changed to 800° C.

Example 1-1-9

An electrode catalyst was prepared in the same procedure as that of Example 1-1-1, except that, in the catalytic metal supporting step, the addition amount of the dinitro diammine platinum (II) nitrate solution was changed to an amount containing 2.5 g of Pt such that a Pt support amount was 20 mass % with respect to the total mass of a final product.

Example 1-1-10

An electrode catalyst was prepared in the same procedure as that of Example 1-1-1, except that, in the oxidation step, the addition amount of potassium permanganate was changed to 18 g (6.8 mol % with respect to the total molar number of carbon atoms of the carbon support material), and the addition amount of 30% hydrogen peroxide water was changed to 10 ml; and in the catalytic metal supporting step, the addition amount of the dinitro diammine platinum (II) nitrate solution was changed to an amount containing 2.5 g of Pt such that a Pt support amount was 20 mass % with respect to the total mass of a final product.

Example 1-1-11

25 g of a carbon support material (TOCA BLACK; #3855; manufactured by Tokai Carbon Co., Ltd.) was weighed into a magnetic dish. This carbon support material was subjected to thermal oxidation in air at 590° C. (conditions: heated for 2 hours and kept at 590° C. for 5 hours) to obtain a carbon support (oxidation step). 420 g of 0.1 N nitric acid aqueous solution was added to 10 g of the carbon support and was dispersed therein. A dinitro diammine platinum (II) nitrate solution and 50 g of 99.5% ethanol were sequentially added to this dispersion, in which the dinitro diammine platinum (II) nitrate solution contains 2.5 g of Pt such that a Pt support amount was 20 mass % with respect to the total mass of a final product. This mixture was sufficiently stirred so as to be substantially homogeneous and was heated at 60° C. to 90° C. for 3 hours. After completion of heating, the obtained dispersion was repeatedly filtered and washed until the conductivity of the filtrate was 5 µS/cm or lower. The obtained solid content was dried by air blowing at 80° C. for 15 hours. The dried powder was subjected to a heat treatment in argon gas at 800° C. (conditions: heated at 5° C./min and kept at 800° C. for 2 hours) (catalytic metal supporting step). With the above-described method, powder of an electrode catalyst was obtained.

Example 1-1-12

An electrode catalyst was prepared in the same procedure as that of Example 1-1-11, except that, in the oxidation step, the thermal oxidation temperature in air was changed to 600° C.

Example 1-1-13

An electrode catalyst was prepared in the same procedure as that of Example 1-1-11, except that, in the oxidation step, the thermal oxidation temperature in air was changed to 600° C.; and, in the catalytic metal supporting step, the heat treatment temperature in argon gas was changed to 700° C.

Example 1-1-14

An electrode catalyst was prepared in the same procedure as that of Example 1-1-11, except that, in the oxidation step, the thermal oxidation temperature in air was changed to 610° C.; and, in the catalytic metal supporting step, the heat treatment temperature in argon gas was changed to 700° C.

Example 1-1-15

An electrode catalyst was prepared in the same procedure as that of Example 1-1-11, except that, in the oxidation step, the thermal oxidation temperature in air was changed to 630° C.; and, in the catalytic metal supporting step, the heat treatment temperature in argon gas was changed to 700° C.

Example 1-1-16

An electrode catalyst was prepared in the same procedure as that of Example 1-1-11, except that, in the oxidation step, the thermal oxidation temperature in air was changed to 630° C.; and, in the catalytic metal supporting step, the heat treatment temperature in argon gas was changed to 700° C.

Comparative Example 1-1-1

420 g of 0.1 N nitric acid aqueous solution was added to 10 g of a carbon support (TOCA BLACK; #3855; manufactured by Tokai Carbon Co., Ltd.) and was dispersed therein. A dinitro diammine platinum (II) nitrate solution and 50 g of 99.5% ethanol were sequentially added to this dispersion, in which the dinitro diammine platinum (II)

nitrate solution contains 4.29 g of Pt such that a Pt support amount was 30 mass % with respect to the total mass of a final product. This mixture was sufficiently stirred so as to be substantially homogeneous and was heated at 60° C. to 90° C. for 3 hours. After completion of heating, the obtained dispersion was repeatedly filtered and washed until the conductivity of the filtrate was 5 µS/cm or lower. The obtained solid content was dried by air blowing at 80° C. for 15 hours. The dried powder was subjected to a heat treatment in argon gas at 700° C. (conditions: heated at 5° C./min and kept at 700° C. for 2 hours) (catalytic metal supporting step). With the above-described method, powder of an electrode catalyst was obtained.

Comparative Example 1-1-2

An electrode catalyst was prepared in the same procedure as that of Comparative Example 1-1-1, except that, in the catalytic metal supporting step, the heat treatment temperature in argon gas was changed to 800° C.

Comparative Example 1-1-3

An electrode catalyst was prepared in the same procedure as that of Comparative Example 1-1-1, except that, in the catalytic metal supporting step, the heat treatment temperature in argon gas was changed to 900° C.

Comparative Example 1-1-4

A carbon support material (Ketjen; manufactured by Lion Corporation) was subjected to a heat treatment in argon gas at 2800° C. (conditions: heated at 5° C./min and kept at 2800° C. for 2 hours) to obtain a carbon support. 420 g of 0.1 N nitric acid aqueous solution was added to 10 g of the carbon support and was dispersed therein. A dinitro diammine platinum (II) nitrate solution and 50 g of 99.5% ethanol were sequentially added to this dispersion, in which the dinitro diammine platinum (II) nitrate solution contains 4.29 g of Pt such that a Pt support amount was 30 mass % with respect to the total mass of a final product. This mixture was sufficiently stirred so as to be substantially homogeneous and was heated at 60° C. to 90° C. for 3 hours. After completion of heating, the obtained dispersion was repeatedly filtered and washed until the conductivity of the filtrate was 5 µS/cm or lower. The obtained solid content was dried by air blowing at 80° C. for 15 hours. The dried powder was subjected to a heat treatment in argon gas at 700° C. (conditions: heated at 5° C./min and kept at 700° C. for 2 hours) (catalytic metal supporting step). With the above-described method, powder of an electrode catalyst was obtained.

Comparative Example 1-1-5

An electrode catalyst was prepared in the same procedure as that of Comparative Example 1-1-4, except that, in the catalytic metal supporting step, the heat treatment temperature in argon gas was changed to 700° C.

Comparative Example 1-1-6

An electrode catalyst was prepared in the same procedure as that of Comparative Example 1-1-1, except that the carbon support material was changed to Ketjen (manufactured by Lion Corporation); and, in the catalytic metal supporting step, the heat treatment temperature in argon gas was changed to 800° C.

Comparative Example 1-1-7

An electrode catalyst was prepared in the same procedure as that of Comparative Example 1-1-1, except that the carbon support material was changed to Ketjen (manufactured by Lion Corporation); and, in the catalytic metal supporting step, the heat treatment temperature in argon gas was changed to 900° C.

Comparative Example 1-1-8

An electrode catalyst was prepared in the same procedure as that of Comparative Example 1-1-1, except that, in the catalytic metal supporting step, the addition amount of the dinitro diammine platinum (II) nitrate solution was changed to an amount containing 2.5 g of Pt such that a Pt support amount was 20 mass % with respect to the total mass of a final product.

Comparative Example 1-1-9

An electrode catalyst was prepared in the same procedure as that of Comparative Example 1-1-1, except that, in the catalytic metal supporting step, the addition amount of the dinitro diammine platinum (II) nitrate solution was changed to an amount containing 2.5 g of Pt such that a Pt support amount was 20 mass % with respect to the total mass of a final product; and in the catalytic metal supporting step, the heat treatment temperature in argon gas was changed to 900° C.

Comparative Example 1-1-10

25 g of a carbon support material (TOCA BLACK; #3855; manufactured by Tokai Carbon Co., Ltd.) was weighed into a magnetic dish. This carbon support material was subjected to thermal oxidation in air at 550° C. (conditions: heated for 2 hours and kept at 550° C. for 5 hours) to obtain a carbon support (oxidation step). 420 g of 0.1 N nitric acid aqueous solution was added to 10 g of the carbon support and was dispersed therein. A dinitro diammine platinum (II) nitrate solution and 50 g of 99.5% ethanol were sequentially added to this dispersion, in which the dinitro diammine platinum (II) nitrate solution contains 2.5 g of Pt such that a Pt support amount was 20 mass % with respect to the total mass of a final product. This mixture was sufficiently stirred so as to be substantially homogeneous and was heated at 60° C. to 90° C. for 3 hours. After completion of heating, the obtained dispersion was repeatedly filtered and washed until the conductivity of the filtrate was 5 µS/cm or lower. The obtained solid content was dried by air blowing at 80° C. for 15 hours. The dried powder was subjected to a heat treatment in argon gas at 800° C. (conditions: heated at 5° C./min and kept at 800° C. for 2 hours) (catalytic metal supporting step). With the above-described method, powder of an electrode catalyst was obtained.

Comparative Example 1-1-11

An electrode catalyst was prepared in the same procedure as that of Comparative Example 1-1-10, except that, in the oxidation step, the thermal oxidation temperature in air was changed to 560° C.

Comparative Example 1-1-12

An electrode catalyst was prepared in the same procedure as that of Comparative Example 1-1-10, except that, in the oxidation step, the thermal oxidation temperature in air was changed to 570° C.

1-2. Platinum Alloy Electrode Catalyst for Cathode

Example 1-2-1

20 g of a carbon support material (TOCA BLACK; #3855; manufactured by Tokai Carbon Co., Ltd.) was added to 350 g of sulfuric acid, followed by stirring. Next, 2.88 g of sodium nitrate and 10.8 g (4.1 mol % with respect to the total molar number of carbon atoms of the carbon support material) of potassium permanganate were added, followed by stirring for 3 days and nights. Next, 800 g of ion exchange water was added, and then 6 ml of 30% hydrogen peroxide water was added. This mixture was stirred for one day and night and was filtered and washed. The washed product was filtered, and the solid content was added to 500 ml of 1 N nitric acid, followed by stirring for 1 day and night. The reaction product was filtered and washed. The washed product was dried at 80° C. for 15 hours and was subjected to a heat treatment in argon gas at 800° C. (conditions: heated at 5° C./min and kept at 800° C. for 2 hours) to obtain a carbon support (oxidation step). 420 g of 0.1 N nitric acid aqueous solution was added to 10 g of the carbon support and was dispersed therein. A dinitro diammine platinum (II) nitrate solution and 50 g of 99.5% ethanol were sequentially added to this dispersion, in which the dinitro diammine platinum (II) nitrate solution contains 4.29 g of Pt such that a Pt support amount was 30 mass % with respect to the total mass of a final product. This mixture was sufficiently stirred so as to be substantially homogeneous and was heated at 60° C. to 90° C. for 3 hours. After completion of heating, the obtained dispersion was repeatedly filtered and washed until the conductivity of the filtrate was 5 µS/cm or lower. The obtained solid content was dried by air blowing at 80° C. for 15 hours. The dried powder was subjected to a heat treatment in argon gas at 800° C. (conditions: heated at 5° C./min and kept at 800° C. for 2 hours). 30 mass % of the obtained Pt-supported carbon support was dispersed in pure water containing an amount 80 times the total mass of the carbon support. A cobalt nitrate aqueous solution, obtained by dissolving a commercially available cobalt nitrate hexahydrate in pure water, was added dropwise to the dispersion in an amount such that a molar ratio (Pt:Co) of platinum to cobalt was 2:1. After completion of dropwise addition, 1 molar equivalent to 6 molar equivalents of a sodium borohydride aqueous solution with respect to cobalt of the cobalt nitrate used was added dropwise. After completion of dropwise addition, the reaction liquid was stirred for 1 hour to 20 hours. Next, the reaction mixture was repeatedly filtered and washed until the conductivity of the filtrate was 5 µS/cm or lower. The obtained powder cake was dried by air blowing at 80° C. for 15 hours. The dried powder was subjected to a heat treatment in argon gas at 800° C. (conditions: heated at 5° C./min and kept at 800° C. for 2 hours) to form an alloy of platinum and cobalt (catalytic metal supporting step). With the above-described method, powder of an electrode catalyst was obtained.

Example 1-2-2

An electrode catalyst was prepared in the same procedure as that of Example 1-2-1, except that, in the oxidation step, the thermal oxidation temperature in argon gas was changed to 700° C.; and in the catalytic metal supporting step, the heat treatment temperature in argon gas after the supporting of platinum was changed to 700° C., and the heat treatment temperature in argon gas after the supporting of cobalt was changed to 700° C.

Example 1-2-3

An electrode catalyst was prepared in the same procedure as that of Example 1-2-1, except that, in the oxidation step, sodium nitrate was not added; in the oxidation step, the thermal oxidation temperature in argon gas was changed to 700° C.; and in the catalytic metal supporting step, the heat treatment temperature in argon gas after the supporting of platinum was changed to 700° C., and the heat treatment temperature in argon gas after the supporting of cobalt was changed to 700° C.

Example 1-2-4

An electrode catalyst was prepared in the same procedure as that of Example 1-2-1, except that, in the oxidation step, sodium nitrate was not added; in the oxidation step, the addition amount of potassium permanganate was changed to 18 g (6.8 mol % with respect to the total molar number of carbon atoms of the carbon support material), the addition amount of 30% hydrogen peroxide water was changed to 10 ml, and the heat treatment temperature in argon gas was changed to 700° C.; and in the catalytic metal supporting step, the heat treatment temperature in argon gas after the supporting of platinum was changed to 700° C., and the heat treatment temperature in argon gas after the supporting of cobalt was changed to 700° C.

Example 1-2-5

An electrode catalyst was prepared in the same procedure as that of Example 1-2-1, except that, in the oxidation step, the heat treatment temperature in argon gas was changed to 700° C.; and in the catalytic metal supporting step, the addition amount of the dinitro diammine platinum (II) nitrate solution was changed to an amount containing 2.5 g of Pt such that a Pt support amount was 20 mass % with respect to the total mass of a final product.

Example 1-2-6

An electrode catalyst was prepared in the same procedure as that of Example 1-2-1, except that, in the catalytic metal supporting step, the addition amount of the dinitro diammine platinum (II) nitrate solution was changed to an amount containing 2.5 g of Pt such that a Pt support amount was 20 mass % with respect to the total mass of a final product.

Example 1-2-7

An electrode catalyst was prepared in the same procedure as that of Example 1-2-1, except that, in the oxidation step, the thermal oxidation temperature in argon gas was changed to 700° C.; and in the catalytic metal supporting step, the addition amount of the dinitro diammine platinum (II) nitrate solution was changed to an amount containing 2.5 g of Pt such that a Pt support amount was 20 mass % with respect to the total mass of a final product, the heat treatment temperature in argon gas after the supporting of platinum was changed to 700° C., and the heat treatment temperature in argon gas after the supporting of cobalt was changed to 700° C.

Example 1-2-8

An electrode catalyst was prepared in the same procedure as that of Example 1-2-1, except that, in the oxidation step, sodium nitrate was not added; in the oxidation step, the thermal oxidation temperature in argon gas was changed to 700° C.; and in the catalytic metal supporting step, the addition amount of the dinitro diammine platinum (II) nitrate solution was changed to an amount containing 2.5 g of Pt such that a Pt support amount was 20 mass % with respect to the total mass of a final product, the heat treatment temperature in argon gas after the supporting of platinum was changed to 700° C., and the heat treatment temperature in argon gas after the supporting of cobalt was changed to 700° C.

Example 1-2-9

An electrode catalyst was prepared in the same procedure as that of Example 1-2-1, except that, in the oxidation step, sodium nitrate was not added; and in the oxidation step, the addition amount of potassium permanganate was changed to 18 g (6.8 mol % with respect to the total molar number of carbon atoms of the carbon support material), the addition amount of 30% hydrogen peroxide water was changed to 10 ml, and the heat treatment temperature in argon gas was changed to 700° C.; and in the catalytic metal supporting step, the addition amount of the dinitro diammine platinum (II) nitrate solution was changed to an amount containing 2.5 g of Pt such that a Pt support amount was 20 mass % with respect to the total mass of a final product, the heat treatment temperature in argon gas after the supporting of platinum was changed to 700° C., and the heat treatment temperature in argon gas after the supporting of cobalt was changed to 700° C.

Example 1-2-10

25 g of a carbon support material (TOCA BLACK; #3855 manufactured by Tokai Carbon Co., Ltd.) was weighed into a magnetic dish. This carbon support material was subjected to thermal oxidation in air at 600° C. (conditions: heated for 2 hours and kept at 600° C. for 5 hours) to obtain a carbon support (oxidation step). 420 g of 0.1 N nitric acid aqueous solution was added to 10 g of the carbon support and was dispersed therein. A dinitro diammine platinum (II) nitrate solution and 50 g of 99.5% ethanol were sequentially added to this dispersion, in which the dinitro diammine platinum (II) nitrate solution contains 2.5 g of Pt such that a Pt support amount was 20 mass % with respect to the total mass of a final product. This mixture was sufficiently stirred so as to be substantially homogeneous and was heated at 60° C. to 90° C. for 3 hours. After completion of heating, the obtained dispersion was repeatedly filtered and washed until the conductivity of the filtrate was 5 μS/cm or lower. The obtained solid content was dried by air blowing at 80° C. for 15 hours. The dried powder was subjected to a heat treatment in argon gas at 800° C. (conditions: heated at 5° C./min and kept at 800° C. for 2 hours). 20 mass % of the obtained Pt-supported carbon support was dispersed in pure water containing an amount 80 times the total mass of the carbon support. A cobalt nitrate aqueous solution, obtained by dissolving a commercially available cobalt nitrate hexahydrate in pure water, was added dropwise to the dispersion in an amount such that a molar ratio (Pt:Co) of platinum to cobalt was 2:1. After completion of dropwise addition, 1 molar equivalent to 6 molar equivalents of a sodium borohydride aqueous solution with respect to cobalt of the cobalt nitrate used was added dropwise. After completion of dropwise addition, the reaction liquid was stirred for 1 hour to 20 hours. Next, the reaction mixture was repeatedly filtered and washed until the conductivity of the filtrate was 5 μS/cm or lower. The obtained powder cake was dried by air blowing at 80° C. for 15 hours. The dried powder was subjected to a heat treatment in argon gas at 800° C. (conditions: heated at 5° C./min and kept at 800° C. for 2 hours) to form an alloy of platinum and cobalt (catalytic metal supporting step). With the above-described method, powder of an electrode catalyst was obtained.

Example 1-2-11

An electrode catalyst was prepared in the same procedure as that of Example 1-2-10, except that, in the catalytic metal supporting step, the heat treatment temperature in argon gas after the supporting of platinum was changed to 700° C., and the heat treatment temperature in argon gas after the supporting of cobalt was changed to 700° C.

Example 1-2-12

An electrode catalyst was prepared in the same procedure as that of Example 1-2-10, except that, in the oxidation step, the thermal oxidation temperature in air was changed to 610° C.; and in the catalytic metal supporting step, the heat treatment temperature in argon gas after the supporting of platinum was changed to 700° C., and the heat treatment temperature in argon gas after the supporting of cobalt was changed to 700° C.

Example 1-2-13

An electrode catalyst was prepared in the same procedure as that of Example 1-2-10, except that, in the oxidation step, the thermal oxidation temperature in air was changed to 620° C.; and in the catalytic metal supporting step, the heat treatment temperature in argon gas after the supporting of platinum was changed to 700° C., and the heat treatment temperature in argon gas after the supporting of cobalt was changed to 700° C.

Example 1-2-14

An electrode catalyst was prepared in the same procedure as that of Example 1-2-10, except that, in the oxidation step, the thermal oxidation temperature in air was changed to 630° C.; and in the catalytic metal supporting step, the heat treatment temperature in argon gas after the supporting of platinum was changed to 700° C., and the heat treatment temperature in argon gas after the supporting of cobalt was changed to 700° C.

Comparative Example 1-2-1

420 g of 0.1 N nitric acid aqueous solution was added to 10 g of a carbon support (TOCA BLACK; #3855; manufactured by Tokai Carbon Co., Ltd.) and was dispersed therein. A dinitro diammine platinum (II) nitrate solution and 50 g of 99.5% ethanol were sequentially added to this dispersion, in which the dinitro diammine platinum (II)

nitrate solution contains 4.29 g of Pt such that a Pt support amount was 30 mass % with respect to the total mass of a final product. This mixture was sufficiently stirred so as to be substantially homogeneous and was heated at 60° C. to 90° C. for 3 hours. After completion of heating, the obtained dispersion was repeatedly filtered and washed until the conductivity of the filtrate was 5 µS/cm or lower. The obtained solid content was dried by air blowing at 80° C. for 15 hours. The dried powder was subjected to a heat treatment in argon gas at 700° C. (conditions: heated at 5° C./min and kept at 700° C. for 2 hours). 30 mass % of the obtained Pt-supported carbon support was dispersed in pure water containing an amount 80 times the total mass of the carbon support. A cobalt nitrate aqueous solution, obtained by dissolving a commercially available cobalt nitrate hexahydrate in pure water, was added dropwise to the dispersion in an amount such that a molar ratio (Pt:Co) of platinum to cobalt was 2:1. After completion of dropwise addition, 1 molar equivalent to 6 molar equivalents of a sodium borohydride aqueous solution with respect to cobalt of the cobalt nitrate used was added dropwise. After completion of dropwise addition, the reaction liquid was stirred for 1 hour to 20 hours. Next, the reaction mixture was repeatedly filtered and washed until the conductivity of the filtrate was 5 µS/cm or lower. The obtained powder cake was dried by air blowing at 80° C. for 15 hours. The dried powder was subjected to a heat treatment in argon gas at 800° C. (conditions: heated at 5° C./min and kept at 800° C. for 2 hours) to form an alloy of platinum and cobalt (catalytic metal supporting step). With the above-described method, powder of an electrode catalyst was obtained.

Comparative Example 1-2-2

An electrode catalyst was prepared in the same procedure as that of Comparative Example 1-2-1, except that the carbon support material was changed to Ketjen (manufactured by Lion Corporation); and, in the catalytic metal supporting step, the heat treatment temperature in argon gas after the supporting of platinum was changed to 800° C.

Comparative Example 1-2-3

An electrode catalyst was prepared in the same procedure as that of Comparative Example 1-2-1, except that the carbon support material was changed to OSAB (manufactured by Denki Kagaku Kogyo K.K.); and, in the catalytic metal supporting step, the heat treatment temperature in argon gas after the supporting of platinum was changed to 800° C.

Comparative Example 1-2-4

An electrode catalyst was prepared in the same procedure as that of Comparative Example 1-2-1, except that, in the catalytic metal supporting step, the addition amount of the dinitro diammine platinum (II) nitrate solution was changed to an amount containing 2.5 g of Pt such that a Pt support amount was 20 mass % with respect to the total mass of a final product.

Comparative Example 1-2-5

An electrode catalyst was prepared in the same procedure as that of Comparative Example 1-2-1, except that, in the catalytic metal supporting step, the addition amount of the dinitro diammine platinum (II) nitrate solution was changed to an amount containing 2.5 g of Pt such that a Pt support amount was 20 mass % with respect to the total mass of a final product; and in the catalytic metal supporting step, the heat treatment temperature in argon gas after the supporting of platinum was changed to 900° C., and the heat treatment temperature in argon gas after the supporting of cobalt was changed to 800° C.

1-3. Platinum Electrode Catalyst for Anode

Example 2-1-1

An electrode catalyst was prepared in the same procedure as that of Example 1-1-16, except that, in the catalytic metal supporting step, the addition amount of the dinitro diammine platinum (II) nitrate solution was changed to an amount containing 0.53 g of Pt such that a Pt support amount was 5 mass % with respect to the total mass of a final product; and in the catalytic metal supporting step, the heat treatment temperature in argon gas was changed to 400° C.

Example 2-1-2

An electrode catalyst was prepared in the same procedure as that of Example 2-1-1, except that, in the catalytic metal supporting step, the addition amount of the dinitro diammine platinum (II) nitrate solution was changed to an amount containing 1.11 g of Pt such that a Pt support amount was 10 mass % with respect to the total mass of a final product.

Comparative Example 2-1-1

An electrode catalyst was prepared in the same procedure as that of Comparative Example 1-1-1, except that, in the catalytic metal supporting step, the addition amount of the dinitro diammine platinum (II) nitrate solution was changed to an amount containing 0.53 g of Pt such that a Pt support amount was 5 mass % with respect to the total mass of a final product; and in the catalytic metal supporting step, the heat treatment temperature in argon gas was changed to 400° C.

Comparative Example 2-1-2

An electrode catalyst was prepared in the same procedure as that of Comparative Example 2-1-1, except that, in the catalytic metal supporting step, the addition amount of the dinitro diammine platinum (II) nitrate solution was changed to an amount containing 1.11 g of Pt such that a Pt support amount was 10 mass % with respect to the total mass of a final product.

II. Evaluation Method of Electrode Catalyst

II-1. Crystallite Size (Lc) of (002) Plane of Carbon of Carbon Support

Using an X-ray diffractometer (XRD; Rint 2500; manufactured by Rigaku Corporation), an XRD spectrum of each of the carbon supports used for preparing the electrode catalysts of Examples and Comparative Examples was measured before the supporting of the catalytic metal. Measurement conditions were as follows: Cu tube, 50 kV, and 300 mA. Based on the obtained XRD spectrum, the crystallite size (Lc) of (002) plane of carbon was determined using the Scherrer equation.

II-2. Specific Surface Area of Carbon Support

Using a specific surface area measuring device (BEL-SORP-mini; manufactured by BEL Japan, Inc.), a BET specific surface area (m²/g) of each of the carbon supports used for preparing the electrode catalysts of Examples and Comparative Examples was measured based on a gas adsorption method before the supporting of the catalytic metal. Measurement conditions were as follows: pre-treatment: 150° C., vacuum degassing for 2 hours; and measurement: measurement of a nitrogen adsorption isotherm using a constant volume method.

II-3. Oxygen Concentration of Carbon Support

Using oxygen analyzer (Model No: EMGA-920; manufactured by Horiba, Ltd.), the oxygen concentration (mass % with respect to the total mass of the carbon support) of each of the carbon supports used for preparing the electrode catalysts of Examples and Comparative Examples was measured before the supporting of the catalytic metal. Measurement conditions were as follows: an impulse heating and melting-NDIR method in inert gas.

II-4. Measurement of Raman Spectrum of Carbon Support

Using a Raman spectrometer (NRS-1000; manufactured by JASCO Corporation), a Raman spectrum of each of the carbon supports used for preparing the electrode catalysts of Examples and Comparative Examples was measured before the supporting of the catalytic metal. Measurement conditions were as follows: laser wavelength: 532 nm; and laser output: 100 mV. In the obtained Raman spectrum, a peak observed in a region of 1300 cm$^{-1}$ to 1400 cm$^{-1}$ was identified as a D-band peak, and a peak observed in a region of 1500 cm$^{-1}$ to 1600 cm$^{-1}$ was identified as a G-band peak. From the identified D-band peak and G-band peak, a full width at half maximum of the G-band peak (G-band FWHM) and an intensity ratio (D/G ratio) of an D-band peak intensity $I_D$ to a G-band peak intensity $I_G$ were determined.

II-5. Measurement of Pore Distribution of Carbon Support

A carbon support (TOCA BLACK; #3855; manufactured by Tokai Carbon Co., Ltd.) was thermally oxidized in the same procedure as that of the oxidation step of Examples 1-1-13 to 1-1-16. Using a pore distribution measuring device (BELSORP-mini; manufactured by BEL Japan, Inc.), the pore distribution of the carbon support was measured based on a gas adsorption method before thermal oxidation, after thermal oxidation at 600° C., after thermal oxidation at 610° C., after thermal oxidation at 620° C., and after thermal oxidation at 630° C. Measurement conditions were as follows: pre-treatment: 120° C., vacuum degassing for 8 hours; and measurement: measurement of a nitrogen adsorption isotherm using a constant volume method.

II-6. Measurement of Support Amount of Catalytic Metal

A predetermined amount of the catalytic metal included in each of the electrode catalysts of Examples and Comparative Examples was dissolved in, for example, aqua regia. Using an inductively coupled plasma (ICP) emission spectrometer (ICPV-8100; manufactured by Shimadzu Corporation), the quantity of catalytic metal ions in the obtained solution was determined. From the determined quantity, the support amount (mass % with respect to the total mass of the electrode catalyst) of the catalytic metal (Pt and Co) supported in the electrode catalyst was determined.

II-7. Crystallite Size of (220) Plane of Platinum Using an X-ray diffractometer (XRD; Rint 2500; manufactured by Rigaku Corporation), an XRD spectrum of each of the electrode catalysts of Examples and Comparative Examples was measured. Measurement conditions were as follows: Cu tube; 50 kV; and 300 mA. Based on the obtained XRD spectrum, the crystallite size of (220) plane of platinum was determined using the Scherrer equation.

II-8. Electron Microscope Observation of Electrode Catalyst

Using a transmission electron microscope (TEM; H9500; manufactured by Hitachi, Ltd.), a surface of the carbon support of each of the electrode catalysts of Examples and Comparative Examples was observed. A sample of each of the electrode catalysts was prepared using a wet dispersion method, and a structure of the carbon support was observed under conditions of an accelerating voltage of 300 kV and a magnification of 1,000,000 times.

II-9. CO Adsorption Amount of Electrode Catalyst 0.05 g of each of the electrode catalysts of Examples and Comparative Examples was weighed into a container. Each sample in the container was heated to 80° C. at 3° C./min in a helium gas (100% He) flow. After the temperature reached 80° C., the inside atmosphere of the container was substituted with hydrogen gas (100% $H_2$). Next, the sample was reduced in a hydrogen atmosphere for 30 minutes. After completion of the reduction, the inside atmosphere of the container was substituted with helium gas (100% He), and then the sample was cooled to 30° C. in a helium gas flow. Next, carbon monoxide (100% CO) was introduced (introduction pressure: 100 kPa) into the container in the form of a pulse. Using a thermal conductivity detector (TCD), the amount of CO which was not bonded to the catalyst was detected, and a difference between the amount of CO bonded to the catalyst and the amount of CO released without being bonded to the catalyst was determined as a CO adsorption amount (ml/g-catalyst) of the sample of the electrode catalyst. Next, this value was divided by a Pt support ratio to calculate a CO adsorption amount (ml/g-Pt) per unit mass of Pt.

II-10. ECSA Retention of Electrode Catalyst

Based on a rotating disk electrode method in which a 0.1 M $HClO_4$ aqueous solution was used as an electrolytic solution, the electrochemical surface area (ECSA) of each of the electrode catalysts of Examples and Comparative Examples was measured. A working electrode was coated with a predetermined amount of platinum. In a state where nitrogen gas ($N_2$) was continuously introduced into the electrolytic solution, potential cycle cleaning (50 mV to 1200 mV based on RHE, 600 cycles) was performed. Next, a potential cycle durability test (400 mV to 1200 mV based on RHE, 5000 cycles) was performed. An ECSA retention (%) was determined from measured values of ECSA before and after the potential cycle durability test.

III. Evaluation Result of Electrode Catalyst

III-1. Preparation Conditions and Physical Properties of Electrode Catalyst

FIGS. 3A to 3C show the summary of preparation conditions of electrode catalysts of Examples and Comparative Examples, and FIGS. 4A to 4C show the physical properties of the electrode catalysts. In addition, FIGS. 1A, 1B, 2A and 2B are transmission electron microscope (TEM) images showing the carbon supports used for preparing the electrode catalysts of Examples and Comparative Examples and showing the electrode catalysts of Examples and Comparative Examples. Further, FIGS. 5 to 14 show relationships among the respective physical properties of the electrode catalysts of Examples and Comparative Examples.

III-2. Platinum-Supported Electrode Catalyst for Cathode

Surfaces of Ketjen and OSAB as commercially available carbon support materials having a large specific surface area and a surface of TOCA BLACK #3855 as a commercially available carbon support material having a small specific surface area were observed using a transmission electron microscope (TEM). FIGS. 1A and 1B are the TEM images of TOCA BLACK #3855. In addition, the crystallite size (Lc) of (002) plane of carbon of each of the carbon support materials was measured by X-ray diffraction XRD) measurement. Ketjen had Lc of 2.0 nm, and OSAB had Lc of 1.8 nm. On the other hand, TOCA BLACK as a commercially available carbon support material having a small specific surface area had Lc of 5.3 nm.

By Raman spectrum measurement, a G-band FWHM and an intensity ratio (D/G ratio) of a D-band peak intensity $I_D$ to a G-band peak intensity $I_G$ of each of the carbon support materials were measured. Ketjen as a commercially available carbon support material having a large specific surface area had a G-band FWHM of 81 cm$^{-1}$ and a D/G ratio of 1.18, and OSAB had a G-band FWHM of 68 cm$^{-1}$ and a D/G ratio of 1.50. On the other hand, TOCA BLACK #3855 as a commercially available carbon support material having a small specific surface area had a G-band FWHM of 39 cm$^{-1}$ and a D/G ratio of 0.34. The above results shows that Ketjen and OSAB has a larger specific surface area but lower crystallinity as compared to TOCA BLACK #3855.

Figure 5:
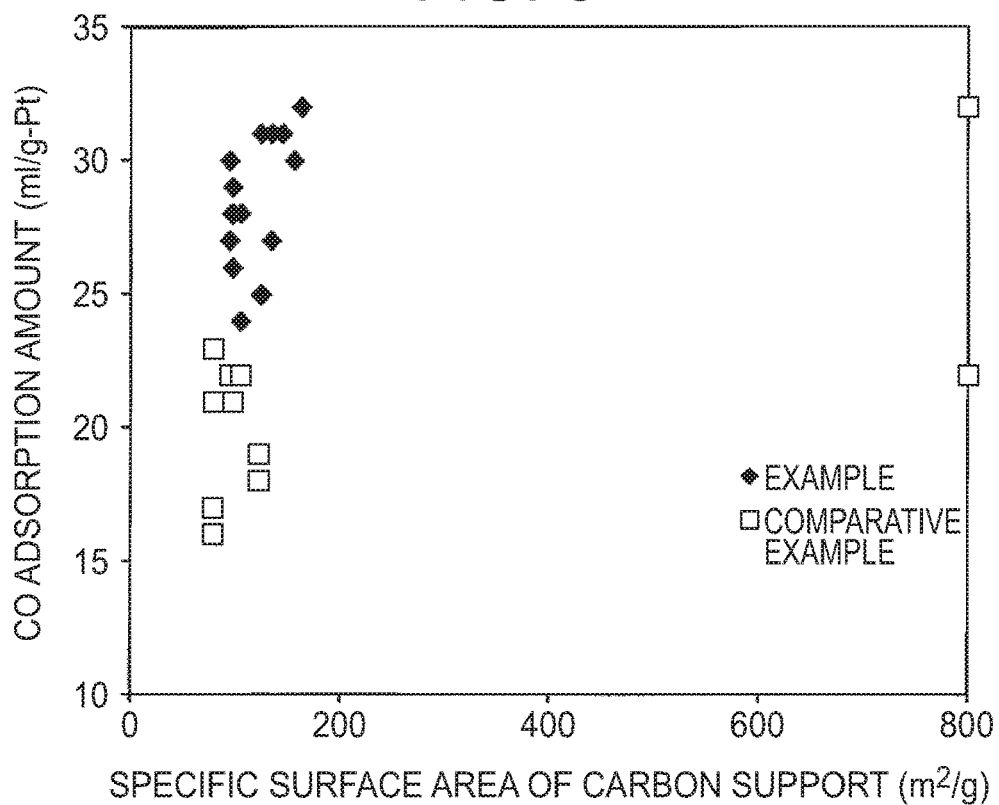
FIG. 5 is a diagram showing a relationship between a specific surface area of a carbon support and a CO adsorption amount in each of platinum-supported electrode catalysts of Examples 1-1-1 to 1-1-16 and Comparative Examples 1-1-1 to 1-1-12.

As shown in FIG. 5, it can be clearly seen that, in the platinum-supported electrode catalysts of Examples 1-1-1 to 1-1-16, the CO adsorption amount was 24 ml/g-Pt or more even when the specific surface area was 170 m$^2$/g or less. The specific surface areas of the platinum-supported electrode catalysts of Examples were within a range of 95 m$^2$/g to 170 m$^2$/g. On the other hand, the CO adsorption amount was less than 24 ml/g-Pt in the platinum-supported electrode catalysts of Comparative Examples 1-1-1, 1-1-2, 1-1-3, 1-1-8, and 1-1-9 which were prepared by using the same carbon support material (specific surface area: 79 m$^2$/g) as that of Examples without performing the oxidation step; and in the platinum-supported electrode catalyst of Comparative Example 1-1-7 which was prepared by using Ketjen (specific surface area: 800 m$^2$/g) as a commercially available carbon support material having a large specific surface area without performing oxidation step.

Figure 6:
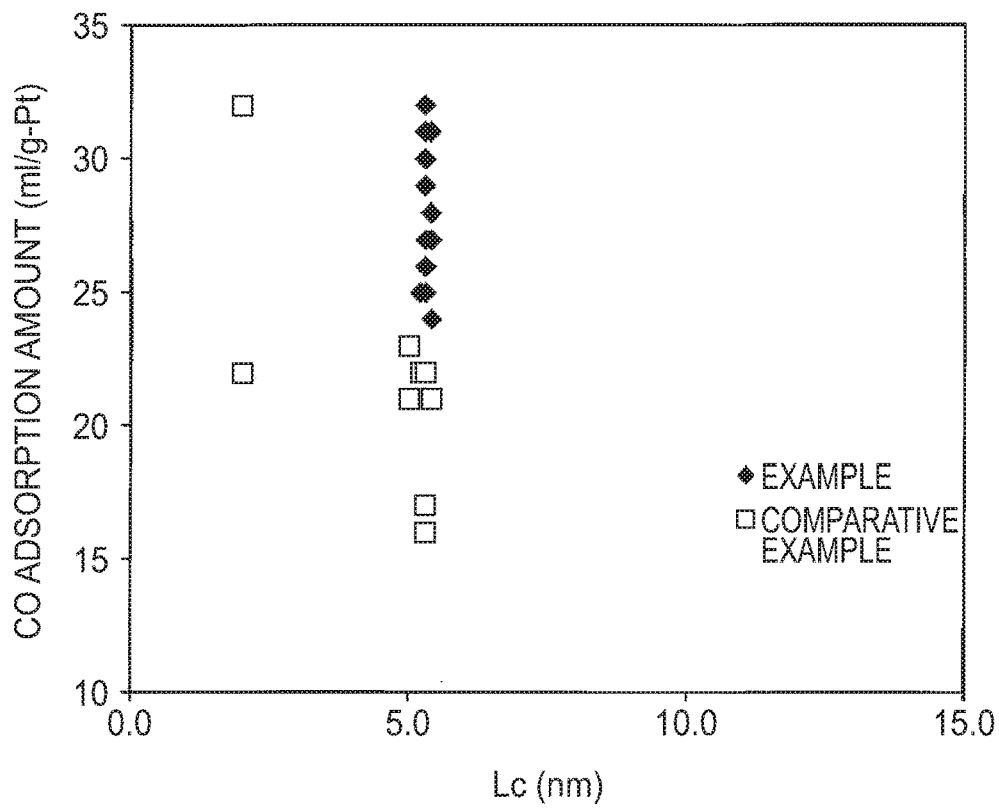
FIG. 6 is a diagram showing a relationship between a crystallite size (Lc) of (002) plane of carbon of a carbon support and a CO adsorption amount in each of the platinum-supported electrode catalysts of Examples 1-1-1 to 1-1-16 and Comparative Examples 1-1-1 to 1-1-12.

As shown in FIG. 6, in the platinum-supported electrode catalysts of Examples 1-1-1 to 1-1-16, the Lc was 5.0 nm or more, and the CO adsorption amount was 24 ml/g-Pt or more. On the other hand, in the platinum-supported electrode catalyst of Comparative Example 1-1-7 which was prepared by using Ketjen as a commercially available carbon support material without performing oxidation step, the Lc was 2.0 nm, and the CO adsorption amount was less than 24 ml/g-Pt.

Figure 7:
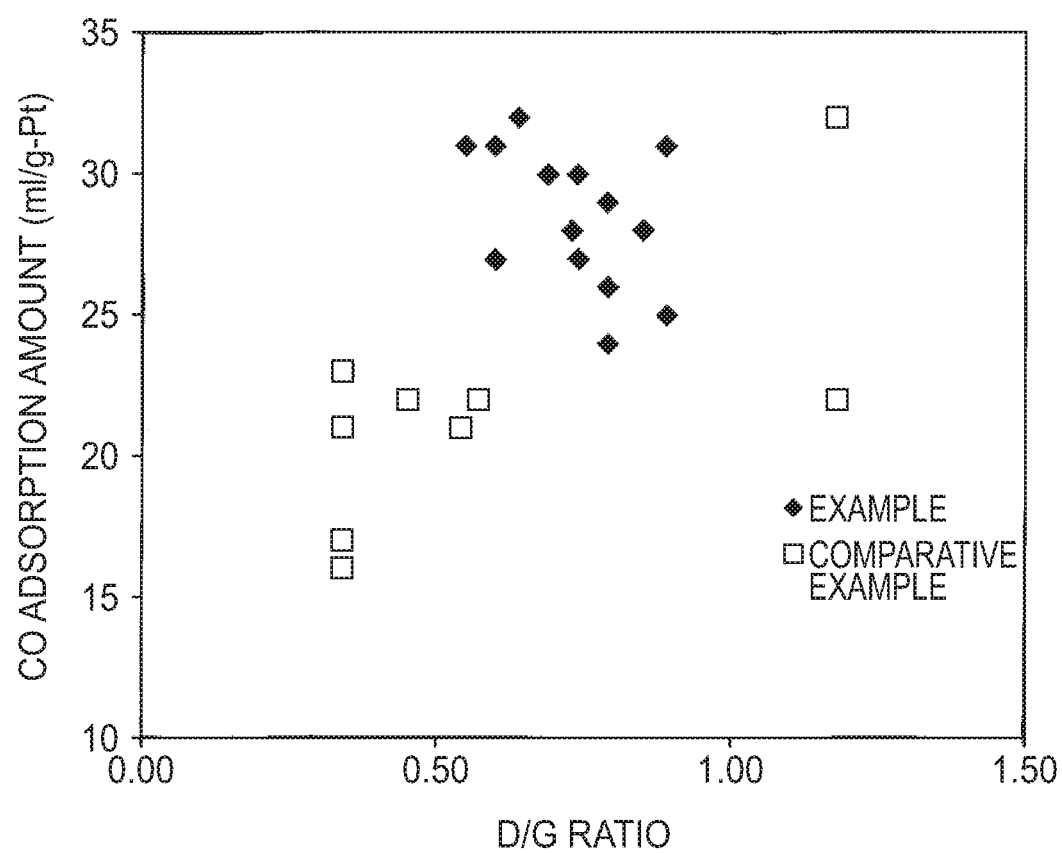
FIG. 7 is a diagram showing a relationship between an intensity ratio of a D-band peak intensity $I_D$ to a G-band peak intensity $I_G$ in a Raman spectrum of a carbon support and a CO adsorption amount in each of the platinum-supported electrode catalysts of Examples 1-1-1 to 1-1-16 and Comparative Examples 1-1-1 to 1-1-12.

As shown in FIG. 7, in the platinum-supported electrode catalysts of Examples 1-1-1 to 1-1-16, the D/G ratio was lower than 0.9, and the CO adsorption amount was 24 ml/g-Pt or more. The D/G ratios of Examples were within a range of 0.5 to lower than 0.9. On the other hand, in the platinum-supported electrode catalysts of Comparative Examples 1-1-1, 1-1-2, 1-1-3, 1-1-8, and 1-1-9 which were prepared by using the same carbon support material as that of Examples without performing the oxidation step, the D/G ratio was 0.34, and the CO adsorption amount was less than 24 ml/g-Pt. In addition, in the platinum-supported electrode catalysts of Comparative Examples 1-1-10 to 1-1-12 which were prepared by performing the oxidation step of thermally oxidizing the same carbon support material as that of Examples in a temperature range of 550° C. to 570° C., the D/G ratio was within a range of 0.45 to 0.57, and the CO adsorption amount was less than 24 ml/g-Pt. On the other hand, in the platinum-supported electrode catalyst of Comparative Example 1-1-7 which was prepared by using Ketjen as a commercially available carbon support material without performing oxidation step, the D/G ratio was 1.17, and the CO adsorption amount was less than 24 ml/g-Pt.

Figure 8:
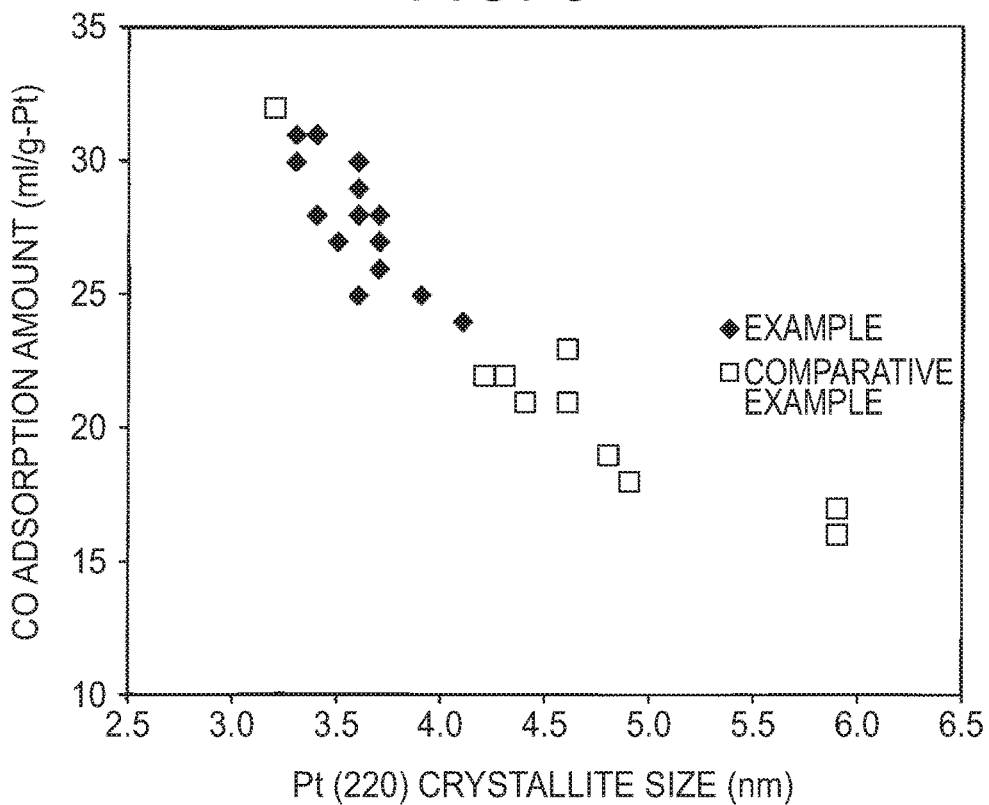
FIG. 8 is a diagram showing a relationship between a crystallite size of (220) plane of platinum of catalytic metal and a CO adsorption amount in each of the platinum-supported electrode catalysts of Examples 1-1-1 to 1-1-16 and Comparative Examples 1-1-1 to 1-1-12.

As shown in FIG. 8, in the platinum-supported electrode catalysts of Examples 1-1-1 to 1-1-16, the crystallite size of (220) plane of platinum was 4.5 nm or less, and the CO adsorption amount was 24 ml/g-Pt or more. The crystallite sizes of (220) plane of platinum of Examples were equal to or greater than 3.2 nm and smaller than 4.1 nm. On the other hand, in the platinum-supported electrode catalysts of Comparative Examples 1-1-1, 1-1-2, and 1-1-3 which were prepared by using the same carbon support material as that of Examples without performing the oxidation step and by performing the catalytic metal supporting step so as to obtain the same platinum support amount (30 mass %) as that of Example 1-1-1, the crystallite size of (220) plane of platinum was 5.9 nm, and the CO adsorption amount was less than 24 ml/g-Pt. In addition, in the platinum-supported electrode catalysts of Comparative Examples 1-1-8 and 1-1-9 which were prepared by performing the catalytic metal supporting step so as to obtain the same platinum support amount (20 mass %) as that of Example 1-1-3, the crystallite size of (220) plane of platinum was 4.6 nm, and the CO adsorption amount was less than 24 ml/g-Pt. In addition, in the platinum-supported electrode catalysts of Comparative Examples 1-1-10 to 1-1-12 which were prepared by performing the oxidation step of thermally oxidizing the same carbon support material as that of Examples in a temperature range of 550° C. to 570° C., the crystallite size of (220) plane of platinum was within a range of 4.2 nm to 4.4 nm, and the CO adsorption amount was less than 24 ml/g-Pt. On the other hand, in the platinum-supported electrode catalyst of Comparative Example 1-1-7 which was prepared by using Ketjen as a commercially available carbon support material without performing oxidation step and by performing the catalytic metal supporting step so as to obtain the same platinum support amount (30 mass %) as that of Example 1-1-1, the crystallite size of (220) plane of platinum was 4.2 nm, and the CO adsorption amount was less than 24 ml/g-Pt.

The platinum-supported electrode catalysts of Comparative Examples 1-1-4 and 1-1-5 were prepared using the same method as that described in International Publication WO 2005/106994. As shown in FIG. 5, in the platinum-supported electrode catalysts of Comparative Example 1-1-4 and 1-1-5, the specific surface area of the carbon support was approximately the same (123 m²/g) as that described in the document, but the CO adsorption amount was less than 24 ml/g-Pt. In addition, as shown in FIG. 8, the crystallite sizes of (220) plane of platinum of the platinum-supported electrode catalysts of Comparative Examples were more than 4.5 nm.

Figure 9:
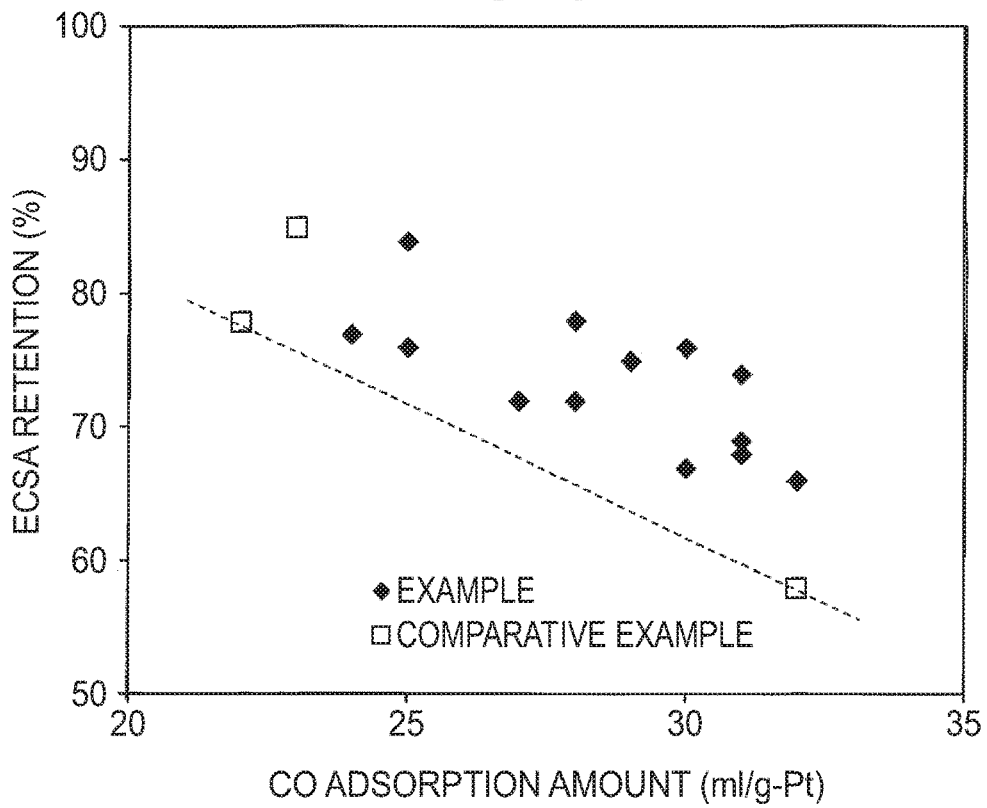
FIG. 9 is a diagram showing a relationship between a CO adsorption amount and an ECSA retention in each of the platinum-supported electrode catalysts of Examples 1-1-1 to 1-1-16 and Comparative Examples 1-1-1 to 1-1-12.
Figure 10:
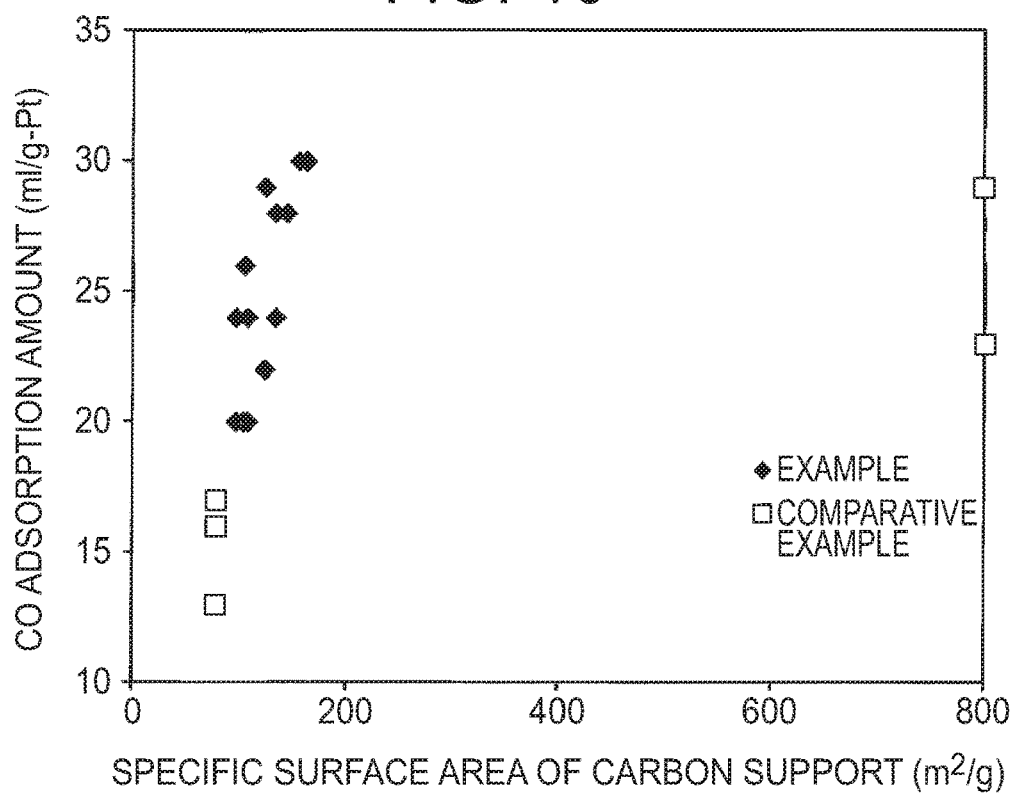
FIG. 10 is a diagram showing a relationship between a specific surface area of a carbon support and a CO adsorption amount in each of platinum alloy-supported electrode catalysts of Examples 1-2-1 to 1-2-14 and Comparative Examples 1-2-1 to 1-2-5.
Figure 11:
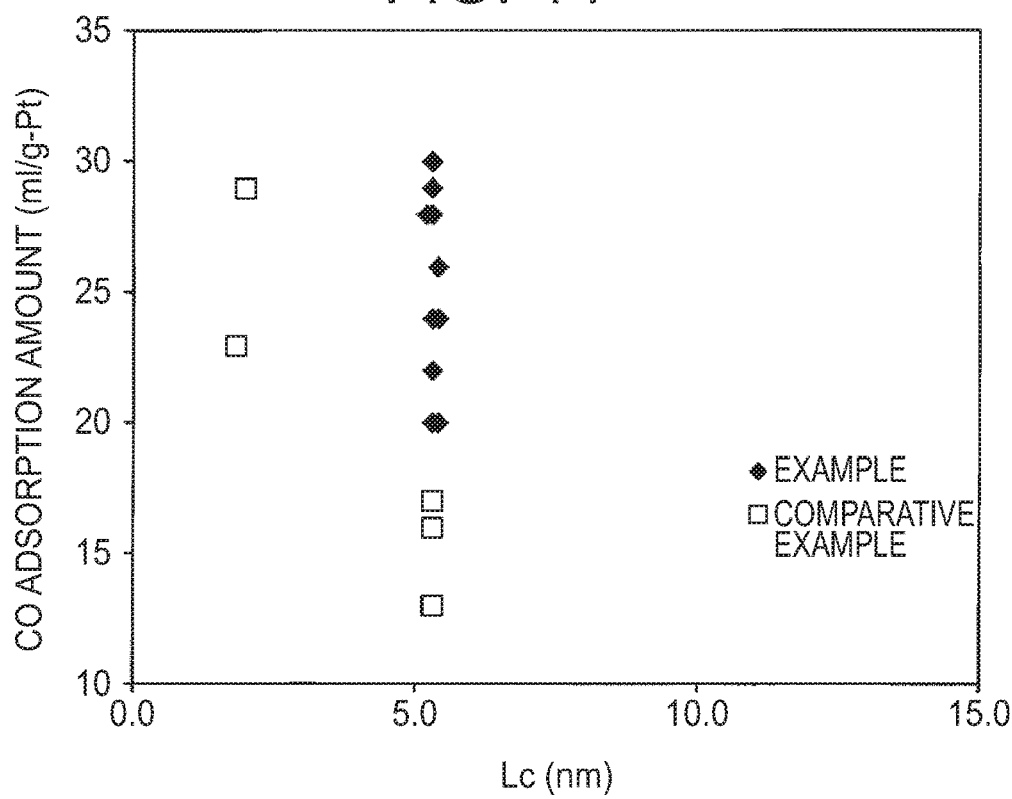
FIG. 11 is a diagram showing a relationship between a crystallite size (Lc) of (002) plane of carbon of a carbon support and a CO adsorption amount in each of the platinum alloy-supported electrode catalysts of Examples 1-2-1 to 1-2-14 and Comparative Examples 1-2-1 to 1-2-5.
Figure 12:
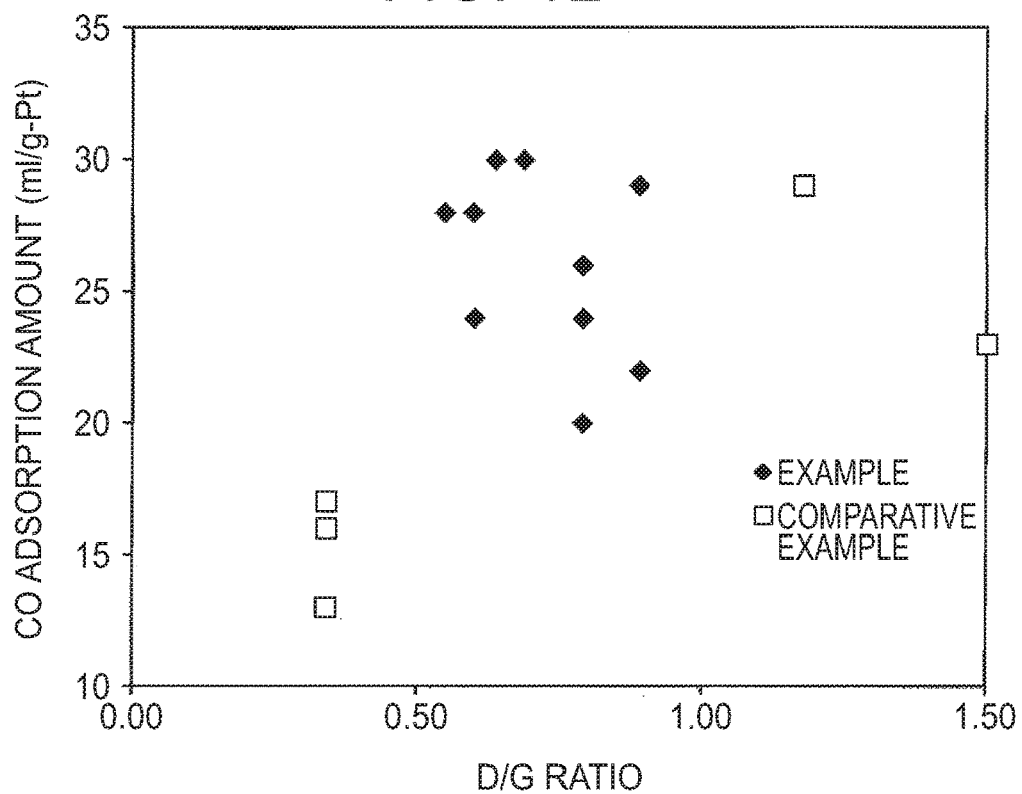
FIG. 12 is a diagram showing a relationship between an intensity ratio of a D-band peak intensity $I_D$ to a G-band peak intensity $I_G$ in a Raman spectrum of a carbon support and a CO adsorption amount in each of the platinum alloy-supported electrode catalysts of Examples 1-2-1 to 1-2-14 and Comparative Examples 1-2-1 to 1-2-5.
Figure 13:
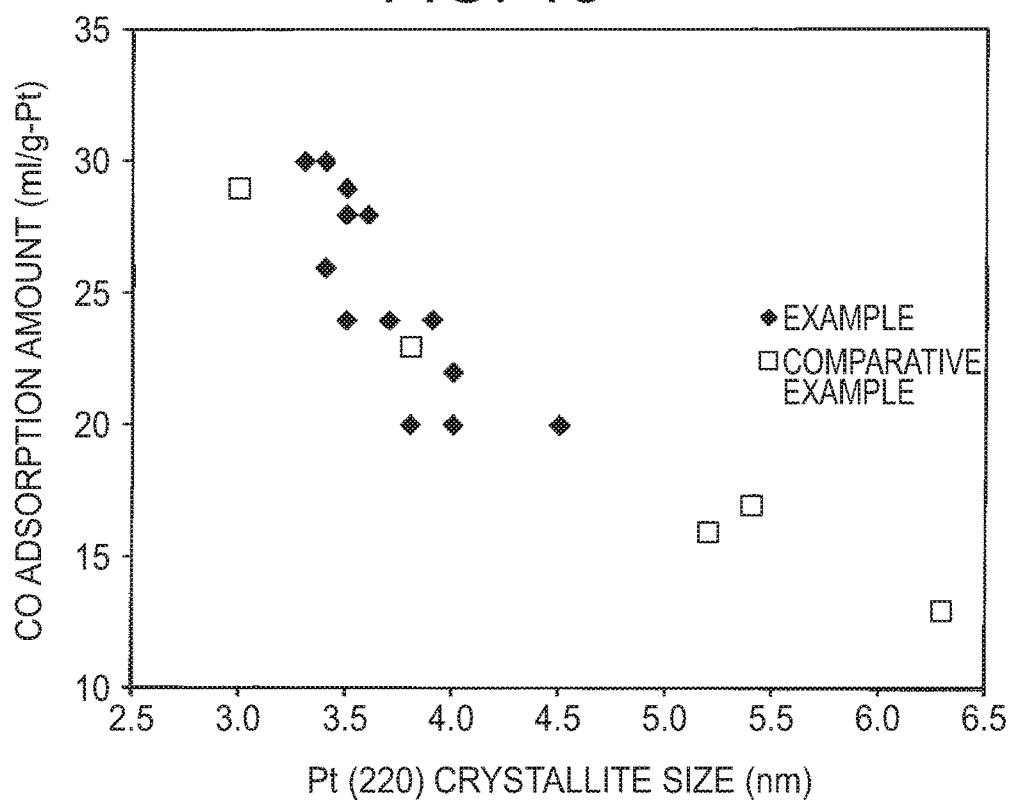
FIG. 13 is a diagram showing a relationship between a crystallite size of (220) plane of platinum of catalytic metal and a CO adsorption amount in each of the platinum alloy-supported electrode catalysts of Examples 1-2-1 to 1-2-14 and Comparative Examples 1-2-1 to 1-2-5.

As shown in FIG. 9, in the platinum-supported electrode catalyst of Comparative Examples, it is difficult to realize both high CO adsorption amount and high ECSA retention. For example, in the platinum-supported electrode catalyst of Comparative Example 1-1-6 having a high CO adsorption amount (32 ml/g-Pt), the ECSA retention was 58%. On the other hand, in the platinum-supported electrode catalyst of Comparative Example 1-1-7 having a high ECSA retention (78%), the CO adsorption amount was 22 ml/g-Pt. Likewise, in the platinum-supported electrode catalyst of Comparative Example 1-1-9 having a high ECSA retention (85%), the CO adsorption amount was 23 ml/g-Pt. In the drawing, a dotted line connecting data points of the platinum-supported electrode catalysts of Comparative Examples 1-1-6 and 1-1-7 is shown.

On the other hand, data points of the CO adsorption amounts and the ECSA retentions of the platinum-supported electrode catalysts of Examples 1-1-1 to 1-1-16 are located above the above-described dotted line. As described above, the platinum-supported electrode catalysts of Examples 1-1-1 to 1-1-16 included a carbon support having a large amount of graphite structure and high crystallinity in the graphite structure. Under operating conditions of a fuel cell, the carbon support having a large amount of high-crystalline graphite structure has high oxidation resistance. Accordingly, it is considered that, in the platinum-supported electrode catalysts of Examples, higher CO adsorption amount and higher ECSA retention were able to be realized as compared to the platinum-supported electrode catalysts of Comparative Examples 1-1-6 and 1-1-7.

III-3. Platinum Alloy-Supported Electrode Catalyst for Cathode

As shown in FIGS. 10 to 13, in the platinum alloy-supported electrode catalysts of Examples 1-2-1 to 1-2-14, as in the case of the platinum-supported electrode catalysts, the specific surface area was 170 m²/g (particularly within a range of 95 m²/g to 170 m²/g), the Lc was 5.0 nm or more, the D/G ratio was lower than 0.9 (particularly equal to or higher than 0.5 and lower than 0.9), and the crystallite size of (220) plane of platinum was 4.5 nm or less (particularly equal to or greater than 3.2 nm and less than 4.1 nm). In this case, in the platinum alloy-supported electrode catalysts of Examples 1-2-1 to 1-2-14, the CO adsorption amount was 18 ml/g-Pt or more.

Figure 14:
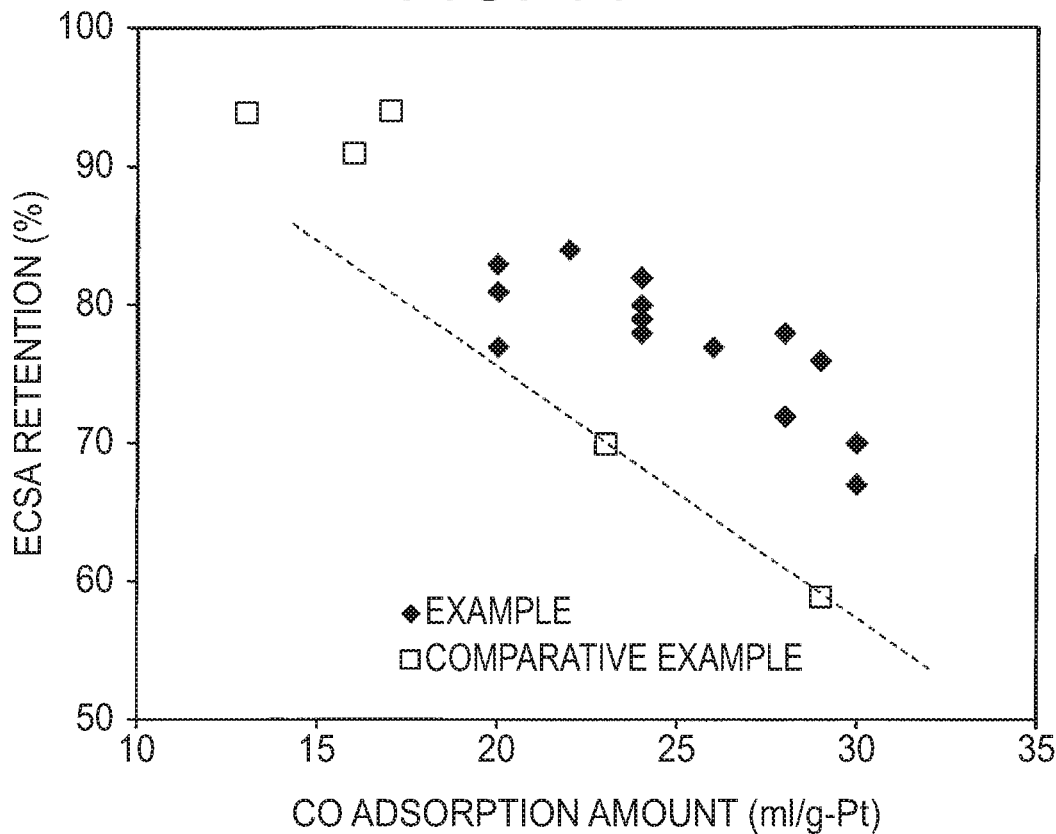
FIG. 14 is a diagram showing a relationship between a CO adsorption amount and an ECSA retention in each of the platinum alloy-supported electrode catalysts of Examples 1-2-1 to 1-2-14 and Comparative Examples 1-2-1 to 1-2-5.

As shown in FIG. 14, as in the case of the platinum alloy-supported electrode catalyst, data points of the CO adsorption amounts and the ECSA retentions of the platinum alloy-supported electrode catalysts of Examples 1-2-1 to 1-2-14 are located above a dotted line connecting data points of the platinum alloy-supported electrode catalyst of Comparative Examples 1-2-2 and 1-2-3. Accordingly, it is considered that, in the platinum alloy-supported electrode catalysts of Examples, higher CO adsorption amount and higher ECSA retention were able to be realized as compared to the platinum alloy-supported electrode catalysts of Comparative Examples 1-2-2 and 1-2-3.

III-4. Pore Distribution of Carbon Support

Figure 15:
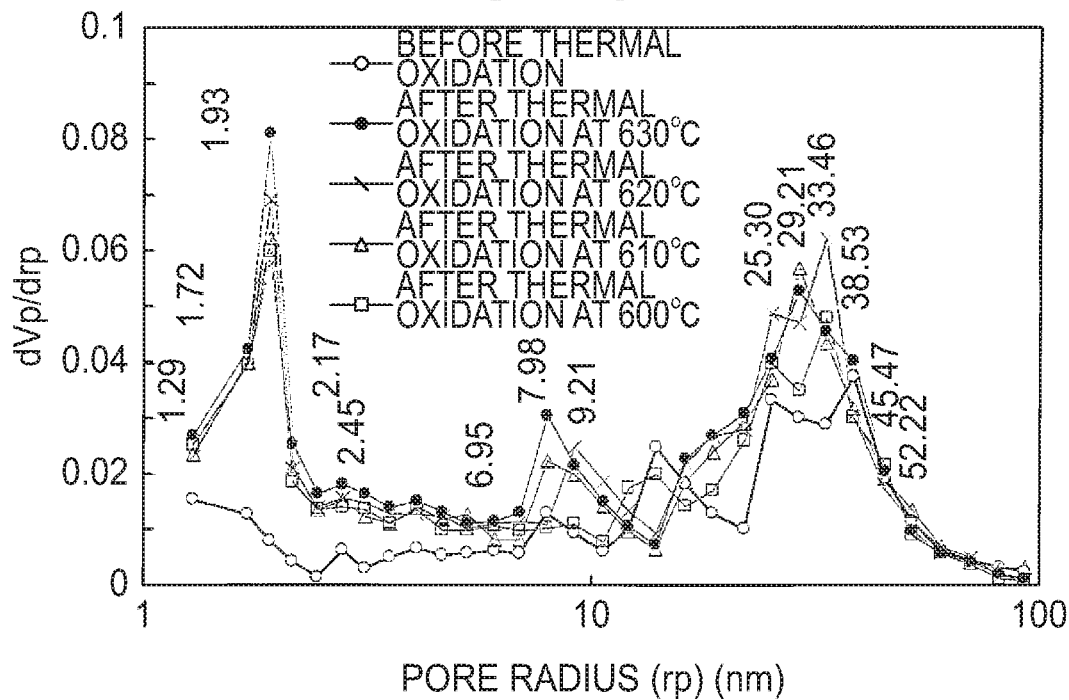
FIG. 15 is a diagram showing pore distributions of a carbon support before thermal oxidation, after thermal oxidation at 600° C., after thermal oxidation at 610° C., after thermal oxidation at 620° C., and after thermal oxidation at 630° C.
Figure 16:
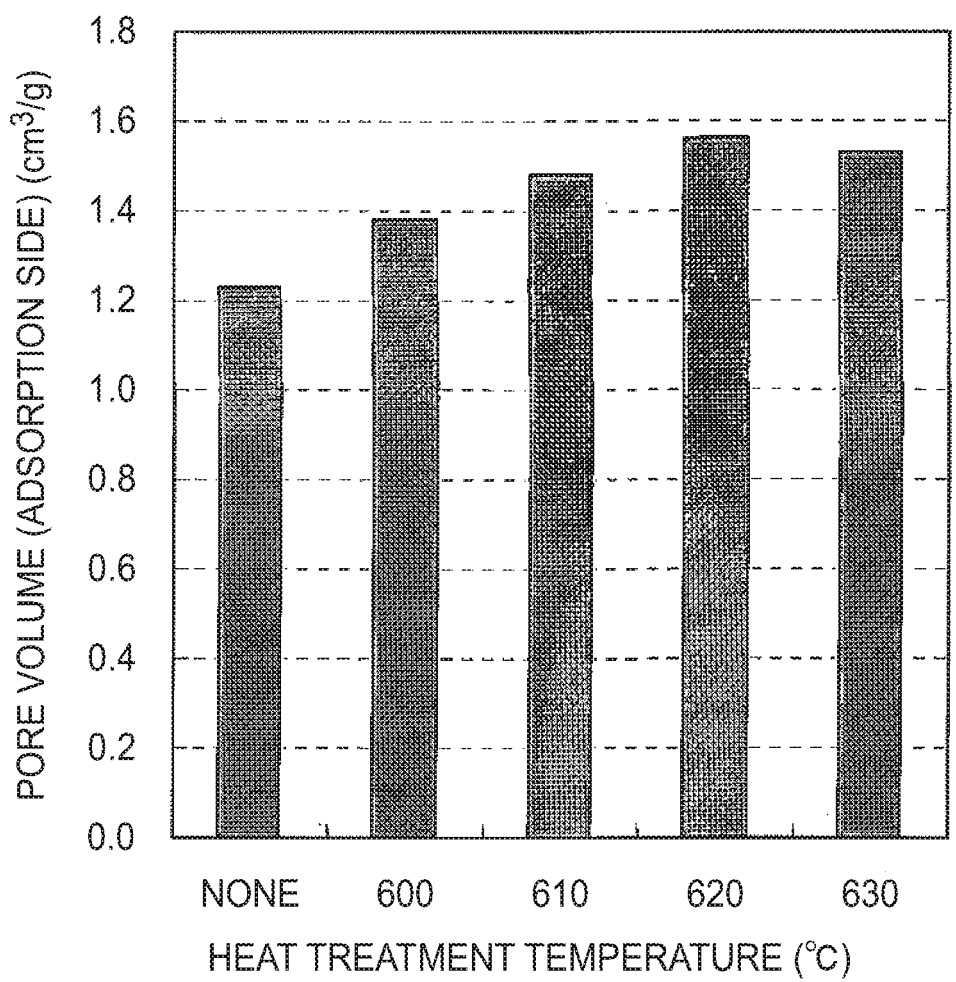
FIG. 16 is a diagram showing a relationship between a thermal oxidation temperature of a carbon support material and a pore volume of a carbon support obtained as a product.

FIG. 15 shows pore distributions of a carbon support before thermal oxidation, after thermal oxidation at 600° C., after thermal oxidation at 610° C., after thermal oxidation at 620° C., and after thermal oxidation at 630° C., and FIG. 16 shows a relationship between a thermal oxidation temperature and a pore volume.

As shown in FIG. 15, the carbon support which was thermally oxidized in a temperature range of 600° C. to 630° C. had additional pores having a radius within a range of 1.0 nm to 2.5 nm (particularly, 1.7 nm to 1.9 nm), as compared to the carbon support before thermal oxidation. In addition, as shown in FIG. 16, in the carbon support which was thermally oxidized in a temperature range of 600° C. to 630° C., the pore volume increased as compared to the carbon support before thermal oxidation. It is considered that this increase in pore volume was caused by the additional pores having the above-described radius being formed by thermal oxidation. Accordingly, it is considered that the additional pores having the above-described radius formed by the thermal oxidation were used as support sites of the catalytic metal.

Figure 2A:
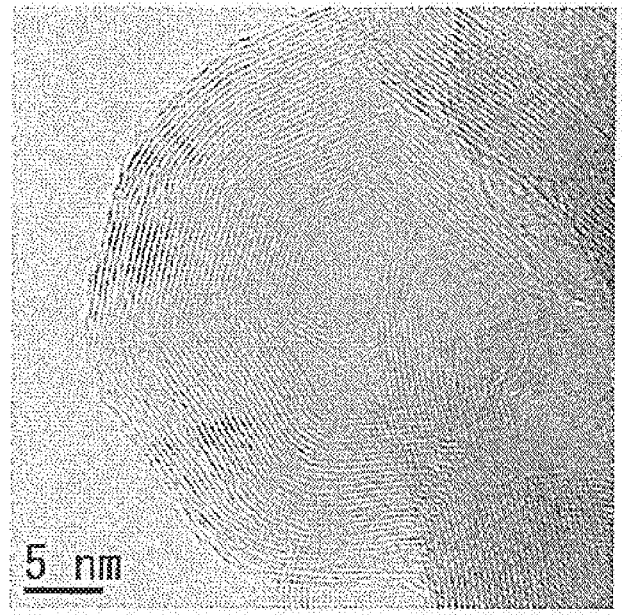
Figure 2B:
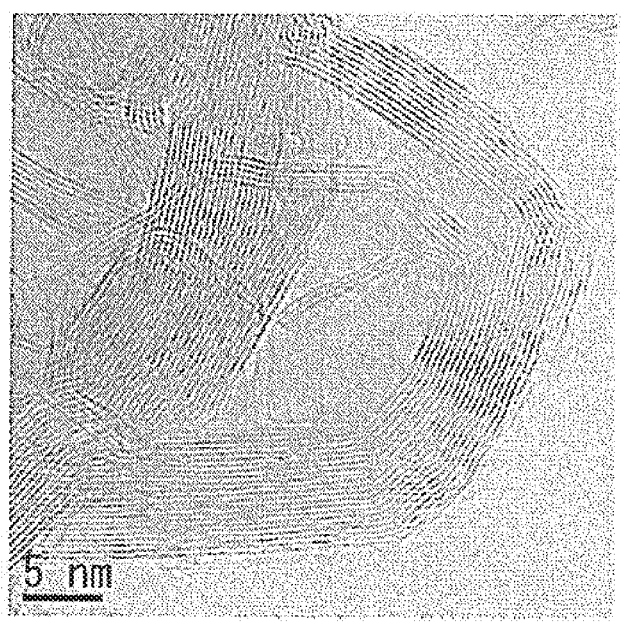

The formation of the pores formed by the thermal oxidation of the carbon support was verified from the TEM images of the carbon support. As shown in FIGS. 2A, 2B, on the surface (FIG. 2A) the carbon support after performing the oxidation step through an oxidizing agent treatment under the same conditions as those of Examples 1-1-7, 1-1-8, 1-2-2, 1-2-5, and 1-2-7 and on the surface (FIG. 2B) of the carbon support after performing the oxidation step through thermal oxidation under the same conditions as those of Examples 1-1-12, 1-1-13, 1-2-10, and 1-2-11, the disturbance of the crystal structure was observed as compared to the surfaces (FIGS. 1A and 1B) of the non-treated carbon support.

III-5. Electrode Catalyst for Anode

As shown in FIG. 4C, in the platinum-supported electrode catalysts for an anode of Examples 2-1-1 and 2-1-2, the carbon support had Lc of 5.0 nm or more and had a specific surface area within a range of 95 m²/g to 170 m²/g. In this case, the catalytic metal had a crystallite size of (220) plane of platinum of 4.5 nm or less and had a CO adsorption amount of 42 ml/g-Pt or more. On the other hand, in the platinum-supported electrode catalysts for an anode of Comparative Examples 2-1-1 and 2-1-2, the specific surface area of the carbon support was 79 m²/g, and the CO adsorption amount was 34 ml/g-Pt or 31 ml/g-Pt.

IV. Preparation of Electrode Catalyst

IV-1. Thermal Oxidation Temperature of Carbon Support

Oxygen is present in air, and thus when a carbon support is thermally oxidized in air (that is, in the presence of oxygen), carbon in the carbon support is burned, and the specific surface area increases. Therefore, the specific surface area can be controlled to be within a desired range by thermally oxidizing a carbon support having high crystallinity and a small specific surface area in air. However, when the thermal oxidation temperature in air excessively increases, the burning of carbon in the carbon support progresses rapidly, which may makes the control of the specific surface area difficult.

Figure 17:
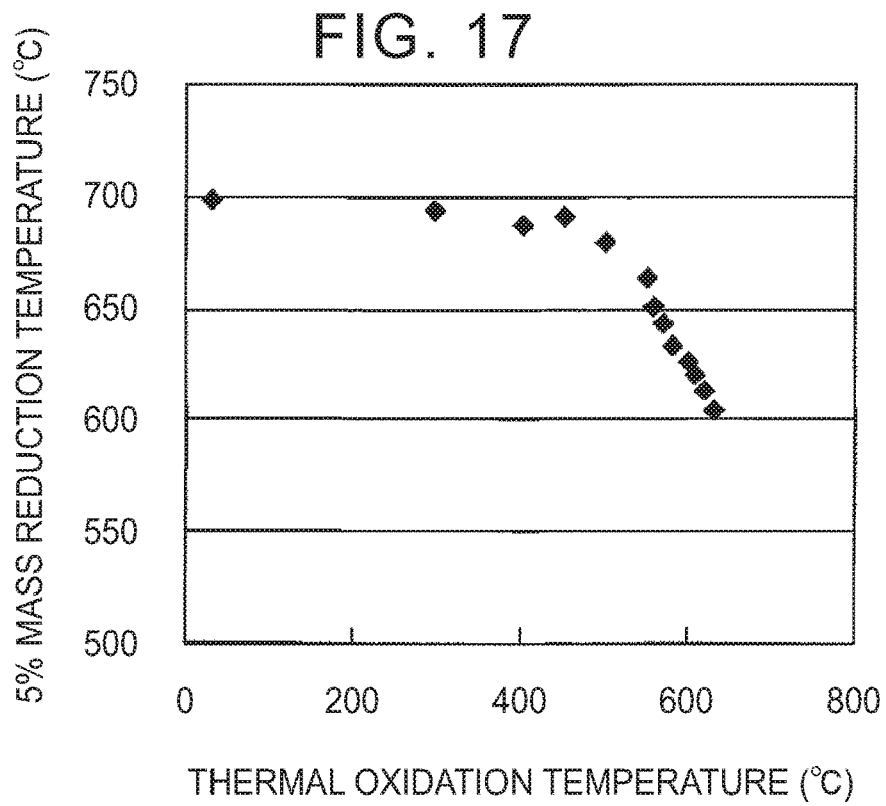
FIG. 17 is a diagram showing a relationship between a thermal oxidation temperature of a carbon support in air and a 5% mass reduction temperature determined by thermogravimetric analysis.

A carbon support (TOCA BLACK; #3855; manufactured by Tokai Carbon Co., Ltd.) was thermally oxidized in air in a temperature range of room temperature to 1000° C. based on the procedure of the oxidation step of Example 1-1-11. Using a thermogravimetric (TG) analyzer (TG8120; manufactured by Rigaku Corporation), the 5% mass reduction temperature (° C.) of the obtained carbon support was determined. FIG. 17 shows a relationship between a thermal oxidation temperature of a carbon support in air and a 5% mass reduction temperature.

As shown in FIG. 17, when the thermal oxidation temperature of the carbon support in air increased to be 500° C. or higher, the 5% mass reduction temperature linearly decreased. When the thermal oxidation temperature in air increased to 630° C., the 5% mass reduction temperature decreased up to about 600° C. Accordingly, when the thermal oxidation temperature of the carbon support in air increases to be higher than 630° C., the oxidation resistance of the carbon support obtained as a product may rapidly decreases.

Figure 18:
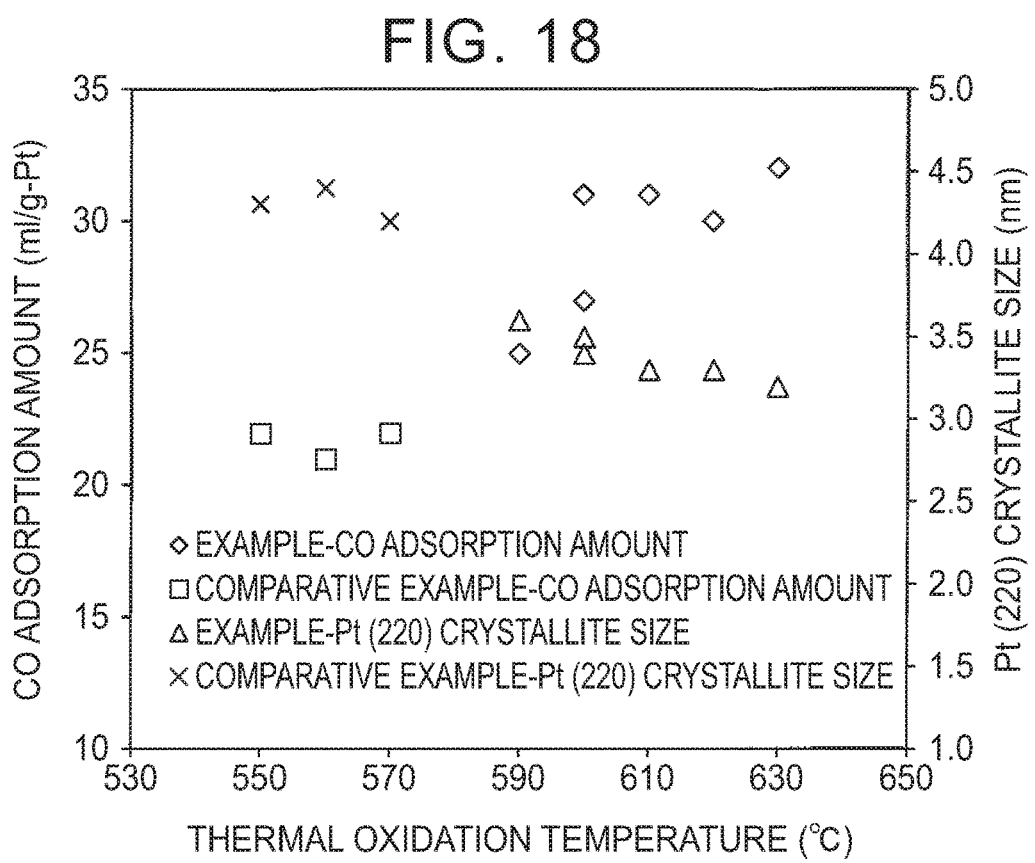
FIG. 18 is a diagram showing a relationship between a thermal oxidation temperature of a carbon support in air, a CO adsorption amount, and a crystallite size of (220) plane of platinum, during preparation of each of the platinum-supported electrode catalysts of Examples 1-1-11 to 1-1-16 and Comparative Examples 1-1-10 to 1-1-12.
Figure 19:
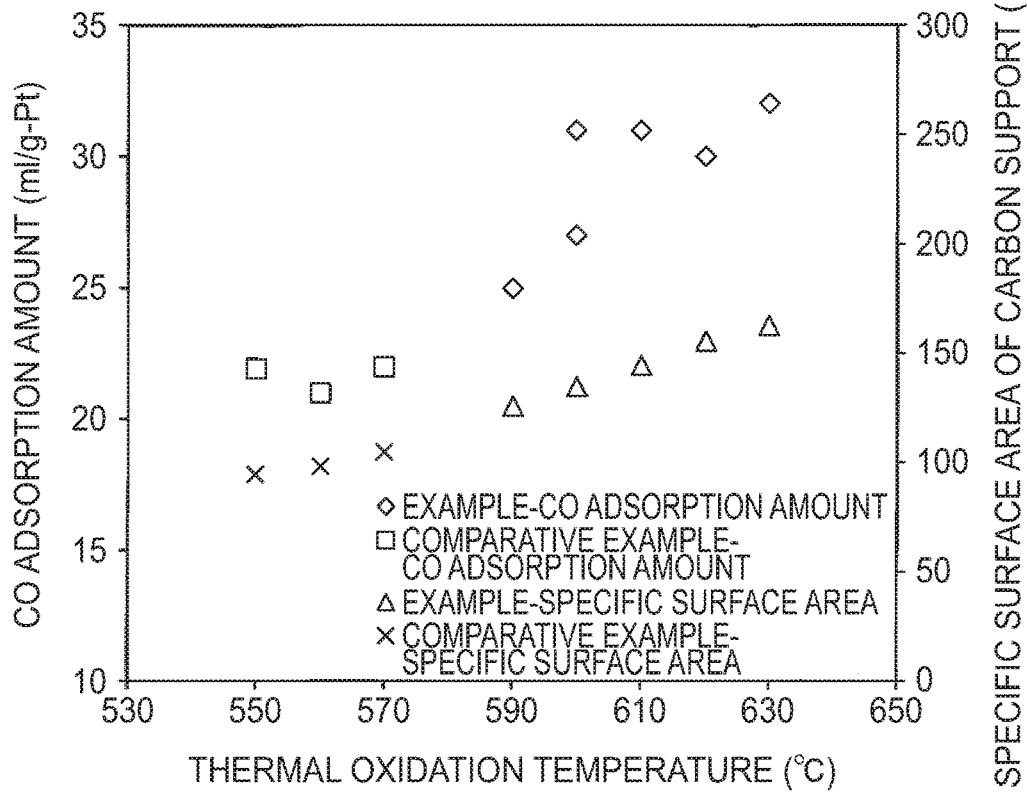
FIG. 19 is a diagram showing a relationship between a thermal oxidation temperature of a carbon support in air, a CO adsorption amount, and a specific surface area of the carbon support, during preparation of each of the platinum-supported electrode catalysts of Examples 1-1-11 to 1-1-16 and Comparative Examples 1-1-10 to 1-1-12.
Figure 20:
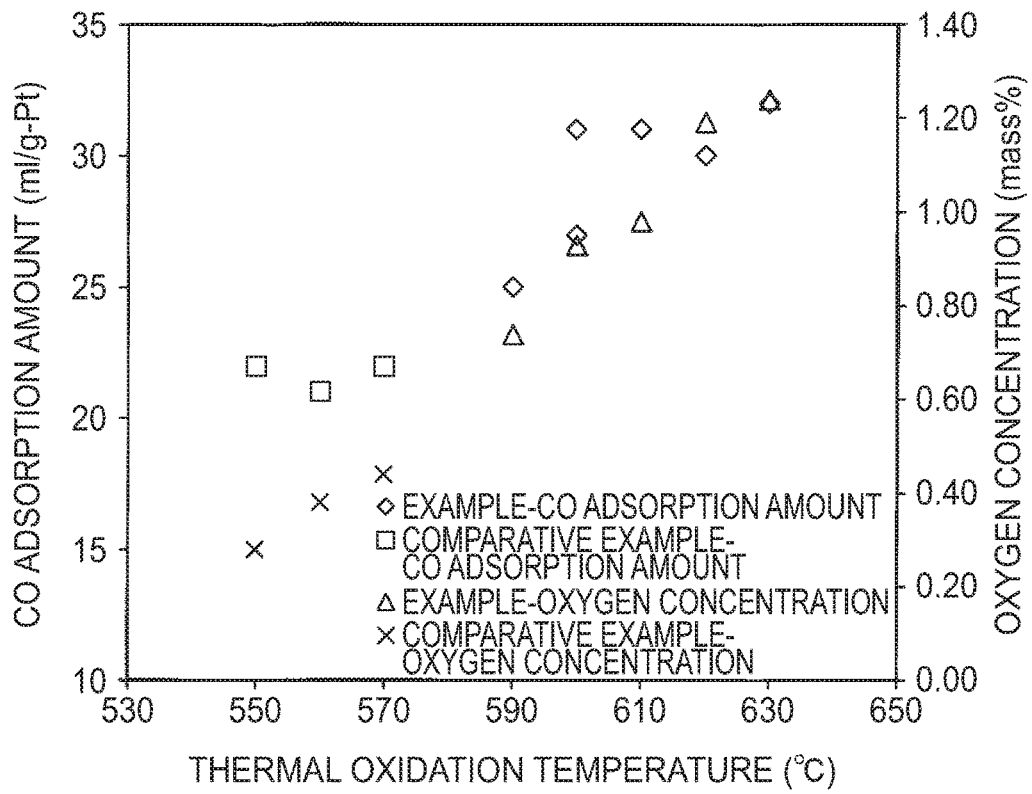
FIG. 20 is a diagram showing a relationship between a thermal oxidation temperature of a carbon support in air, a CO adsorption amount, and an oxygen concentration in the carbon support, during preparation of each of the platinum-supported electrode catalysts of Examples 1-1-11 to 1-1-16 and Comparative Examples 1-1-10 to 1-1-12.
Figure 21:
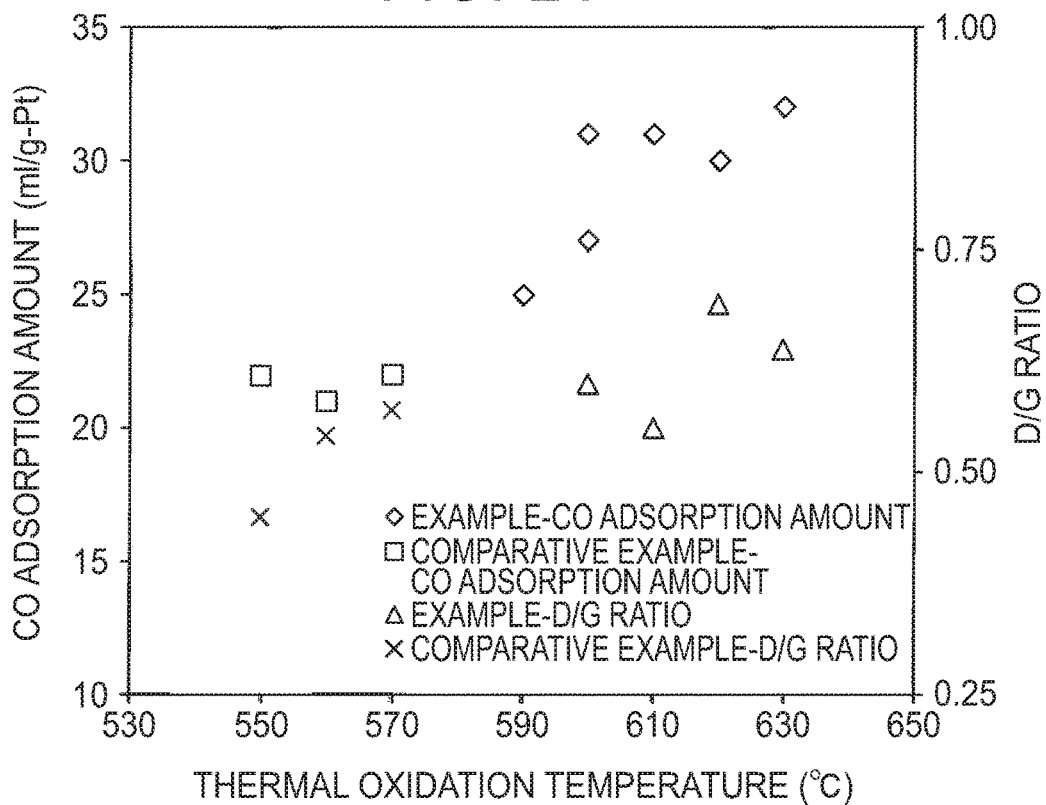
FIG. 21 is a diagram showing a relationship between a thermal oxidation temperature of a carbon support in air, a CO adsorption amount, and a D/G ratio of the carbon support, during preparation of each of the platinum-supported electrode catalysts of Examples 1-1-11 to 1-1-16 and Comparative Examples 1-1-10 to 1-1-12.

During preparation of each of the platinum-supported electrode catalysts of Examples 1-1-11-1 to 1-1-16 and Comparative Examples 1-1-10 to 1-1-12, FIG. 18 shows a relationship between a thermal oxidation temperature of a carbon support in air, a CO adsorption amount, and a crystallite size of (220) plane of platinum, FIG. 19 shows a relationship between a thermal oxidation temperature of a carbon support in air, a CO adsorption amount, and a specific surface area of the carbon support, FIG. 20 shows a relationship between a thermal oxidation temperature of a carbon support in air, a CO adsorption amount, and an oxygen concentration in the carbon support, and FIG. 21 shows a relationship between a thermal oxidation temperature of a carbon support in air, a CO adsorption amount, and a D/G ratio of the carbon support.

As shown in FIG. 18, when the thermal oxidation temperature of the carbon support in air was 580° C. or higher, a platinum-supported electrode catalyst having a CO adsorption amount of 24 ml/g-Pr or more and having a crystallite size of (220) plane of platinum of 4.1 nm or less was obtained. It is considered that the above result was caused because, when the thermal oxidation temperature of the carbon support in air was 580° C. or higher, the specific surface area of the carbon support increased along with an increase in the thermal oxidation temperature in air (FIG. 19). In addition, when the thermal oxidation temperature of the carbon support in air was 580° C. or higher, the oxygen concentration in the carbon support increased along with an increase in the thermal oxidation temperature in air (FIG. 20). The above result shows that carbon of the carbon support was oxidized due to the thermal oxidation of the carbon support; therefore, pores capable of being used as support sites of the catalytic metal were formed (FIGS. 15 and 14). Further, as shown in FIG. 21, when the thermal oxidation temperature of the carbon support in air increased, the D/G ratio of the carbon support increased. The above result shows that the amount of a graphite structure of the carbon support decreased due to the thermal oxidation of the carbon support; therefore, the amount of a non-graphite structure increased.

Figure 22:
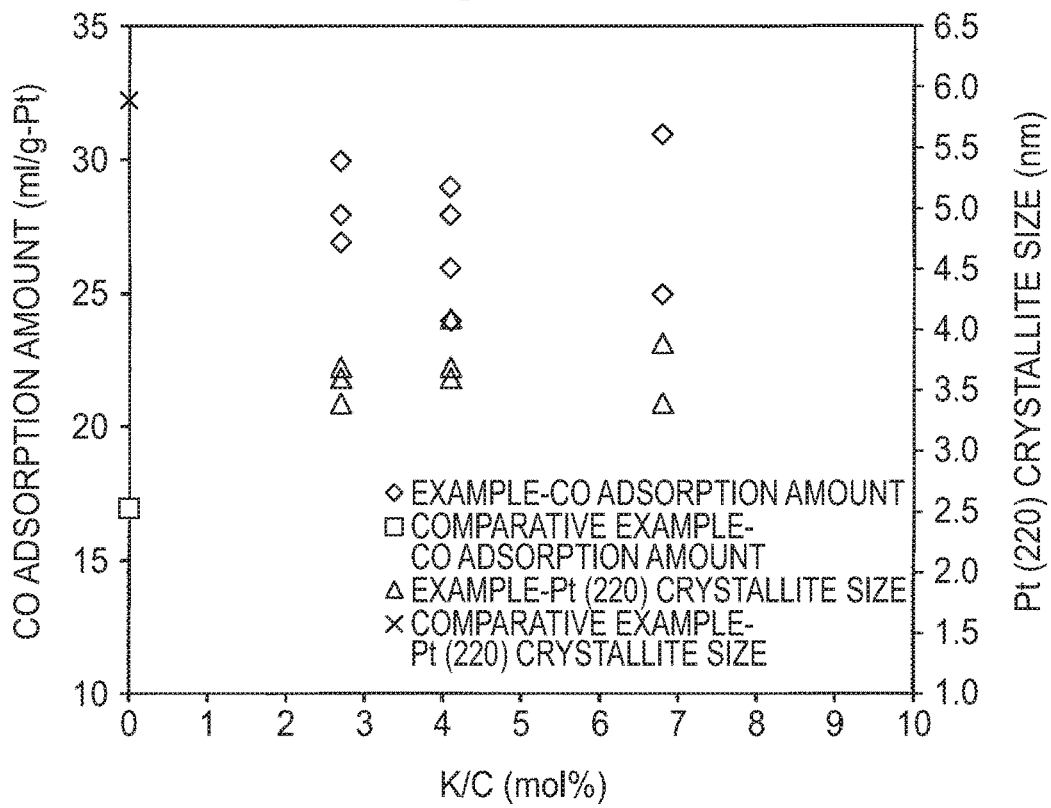
FIG. 22 is a diagram showing a relationship between a K/C ratio of a carbon support during a treatment with an oxidizing agent (potassium permanganate), a CO adsorption amount, and a crystallite size of (220) plane of platinum, during preparation of each of the platinum-supported electrode catalysts of Examples 1-1-1 to 1-1-10 and Comparative Examples 1-1-1.
Figure 23:
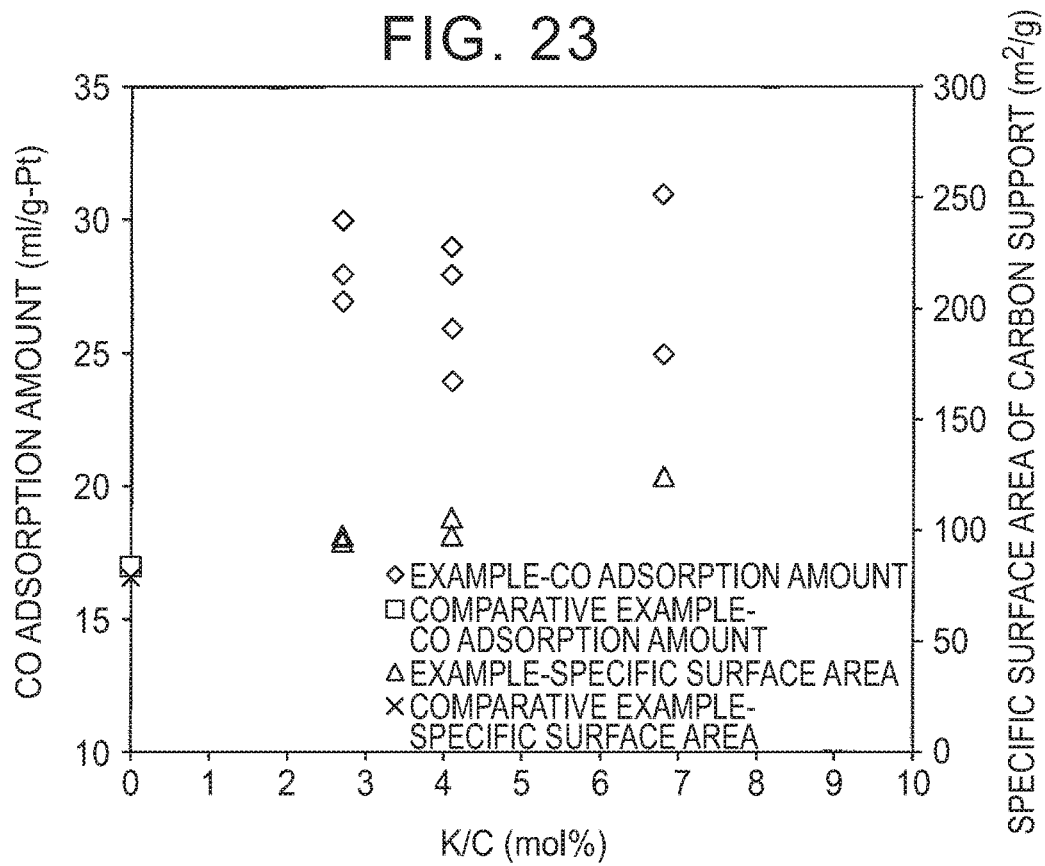
FIG. 23 is a diagram showing a relationship between a K/C ratio of a carbon support during a treatment with an oxidizing agent (potassium permanganate), a CO adsorption amount, and a specific surface area of the carbon support, during preparation of each of the platinum alloy-supported electrode catalysts of Examples 1-1-1 to 1-1-10 and Comparative Examples 1-1-1.
Figure 24:
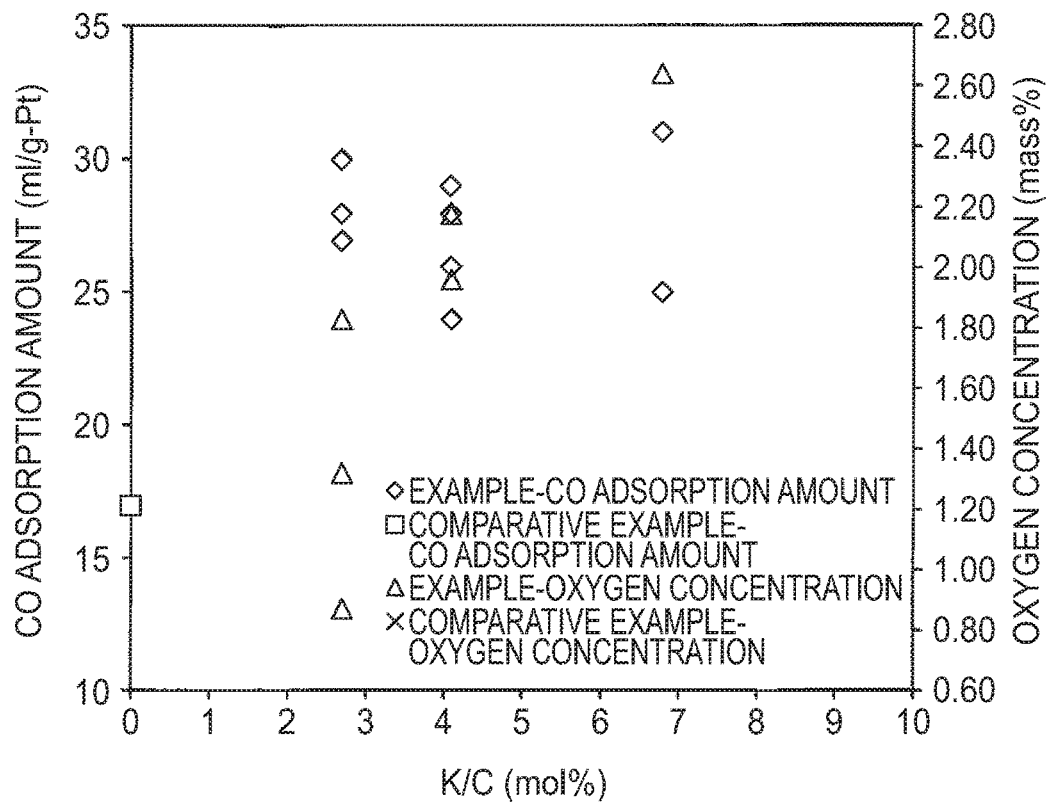
FIG. 24 is a diagram showing a relationship between a K/C ratio of a carbon support during a treatment with an oxidizing agent (potassium permanganate), a CO adsorption amount, and an oxygen concentration in the carbon support, during preparation of each of the platinum-supported electrode catalysts of Examples 1-1-11 to 1-1-16 and Comparative Examples 1-1-10 to 1-1-12.
Figure 25:
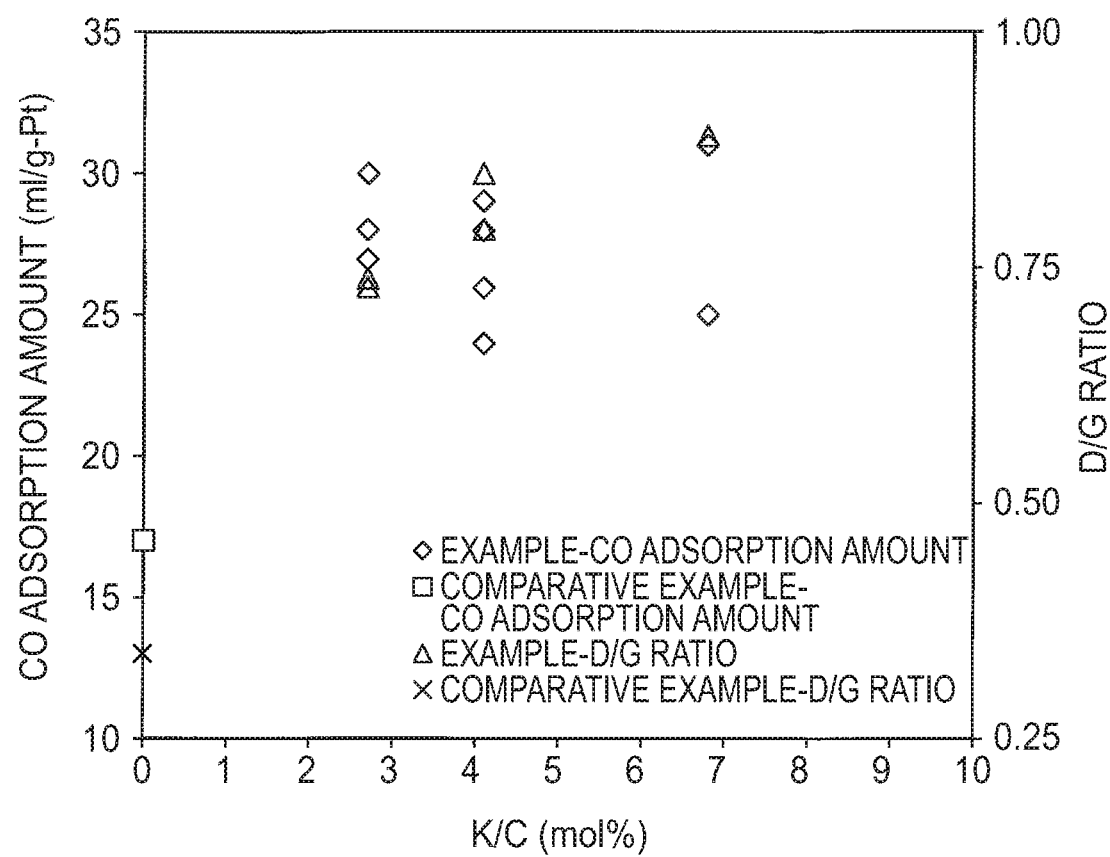
FIG. 25 is a diagram showing a relationship between a K/C ratio of a carbon support during a treatment with an oxidizing agent (potassium permanganate), a CO adsorption amount, and a D/G ratio of the carbon support, during preparation of each of the platinum-supported electrode catalysts of Examples 1-1-11 to 1-1-16 and Comparative Examples 1-1-10 to 1-1-12.

During preparation of each of the platinum-supported electrode catalysts of Examples 1-1-1 to 1-1-10 and Comparative Examples 1-1-1, FIG. 22 shows a relationship between a K/C ratio of a carbon support during a treatment with an oxidizing agent (potassium permanganate), a CO adsorption amount, and a crystallite size of (220) plane of platinum, FIG. 23 shows a relationship between a K/C ratio of a carbon support during a treatment with an oxidizing agent (potassium permanganate), a CO adsorption amount, and a specific surface area of the carbon support, FIG. 24 shows a relationship between a K/C ratio of a carbon support during a treatment with an oxidizing agent (potassium permanganate), a CO adsorption amount, and an oxygen concentration in the carbon support, and FIG. 25 shows a relationship between a K/C ratio of a carbon support during a treatment with an oxidizing agent (potassium permanganate), a CO adsorption amount, and a D/G ratio of the carbon support.

As shown in FIG. 22, when the K/C ratio of the carbon support during a treatment with an oxidizing agent (potassium permanganate) was 2.5 mol % or higher, a platinum-supported electrode catalyst having a CO adsorption amount of 24 ml/g-Pr or more and having a crystallite size of (220) plane of platinum of 4.1 nm or less was obtained. It is considered that the above result was caused because, when the K/C ratio was 2.5 mol % or higher, the specific surface area of the carbon support increased along with the oxidation of the carbon support (FIG. 23). In addition, when the K/C ratio of the carbon support during a treatment with an oxidizing agent (potassium permanganate) was 2.5 mol % or higher, the oxygen concentration in the carbon support increased along with the thermal oxidation temperature of the carbon support in air (FIG. 24). The above result shows that carbon of the carbon support was oxidized due to the thermal oxidation of the carbon support; therefore, pores capable of being used as support sites of the catalytic metal were formed. Further, as shown in FIG. 25, when the K/C ratio of the carbon support during a treatment with an oxidizing agent (potassium permanganate) increased, the D/G ratio of the carbon support increased. The above result shows that the amount of a graphite structure of the carbon support decreased due to the oxidizing agent treatment of the carbon support; therefore, the amount of a non-graphite structure increased.

What is claimed is:
1. A method of producing an electrode catalyst, the method comprising:
    oxidizing a carbon support material by thermally oxidizing the carbon support material in a temperature range of 580° C. to 650° C. in the presence of oxygen or by treating the carbon support material with an oxidizing agent such that a carbon support having a crystallite size of (002) plane of carbon within a range of 5.0 nm or more and having a specific surface area within a range of 95 $m^2/g$ to 170 $m^2/g$ is obtained; and
    causing the obtained carbon support and a catalytic metal material selected from platinum and a platinum alloy to react with each other such that catalytic metal is supported on the carbon support,
    wherein the electrode catalyst for a fuel cell comprises:
    the carbon support having a plurality of crystallite, the crystallite size of (002) plane of crystallite within a range of 5.0 nm or more, and having the specific surface area within a range of 95 $m^2/g$ to 170 $m^2/g$,
    the catalytic metal selected from platinum or the platinum alloy,
    the catalytic metal having a crystallite size of (220) plane of platinum being equal to or greater than 3.2 nm and smaller than 4.1 nm, and
    wherein the catalytic metal is supported on the carbon support.
2. The method according to claim 1, wherein the oxidizing agent contains potassium permanganate.

3. The method according to claim 1, wherein an amount of the oxidizing agent is within a range of 2.5 mol % to 14.5 mol % with respect to a total molar number of carbon atoms of the carbon support material.

* * * * *